(12) United States Patent
Imaizumi et al.

(10) Patent No.: US 7,073,709 B2
(45) Date of Patent: Jul. 11, 2006

(54) INFORMATION PROCESSING APPARATUS AND METHOD, COMMUNICATION PROCESSING APPARATUS AND METHOD, AND COMPUTER PROGRAM

(75) Inventors: Ryoichi Imaizumi, Tokyo (JP); Yuichi Abe, Tokyo (JP); Shinya Ishii, Tokyo (JP); Norikazu Hiraki, Kanagawa (JP); Kenichiro Nakamura, Saitama (JP); Hiroyuki Segawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 171 days.

(21) Appl. No.: 10/712,450

(22) Filed: Nov. 12, 2003

(65) Prior Publication Data

US 2004/0155100 A1 Aug. 12, 2004

(30) Foreign Application Priority Data

Nov. 12, 2002 (JP) .......................... P2002-328079

(51) Int. Cl.
*G06F 17/00* (2006.01)
(52) U.S. Cl. ....................................... 235/375; 235/487
(58) Field of Classification Search ................ 235/375, 235/462.25, 470, 487
See application file for complete search history.

(56) References Cited

U.S. PATENT DOCUMENTS

| | | | | |
|---|---|---|---|---|
| 6,102,289 A | * | 8/2000 | Gabrielson | ............. 235/462.01 |
| 6,398,117 B1 | * | 6/2002 | Oakeson et al. | ............. 235/494 |
| 6,491,223 B1 | * | 12/2002 | Longacre et al. | ...... 235/462.01 |
| 2003/0110472 A1 | * | 6/2003 | Alloing et al. | ............. 717/122 |

FOREIGN PATENT DOCUMENTS

| | | |
|---|---|---|
| JP | 8-69436 | 3/1996 |
| JP | 2000-82107 | 3/2000 |
| JP | 2001-222433 | 8/2001 |

* cited by examiner

*Primary Examiner*—Thien M. Le
*Assistant Examiner*—Edwyn Labaze
(74) *Attorney, Agent, or Firm*—Bell, Boyd & Lloyd LLC

(57) ABSTRACT

An information processing method provided, wherein an identifier (ID) corresponding to an object is obtained based on information input from a sensor for detecting the object, and the obtained ID is continuously and repeatedly input to an information processing unit. The information processing unit compares a program that is set based on a newly-input ID with a program that is set based on an already-input ID, and ends the currently-executed program when the two programs are different from each other. In this method, by putting an object in a sensor effective area, a program corresponding to the ID of the object is started, and by removing the object from the sensor effective area, the program is ended.

22 Claims, 21 Drawing Sheets

FIG. 4

| ID | PATH OF EXECUTION FILE |
|---|---|
| 001012 | /usr/local/bin/game.exe |
| 002031 | /usr/bin/app.sh |
| 032001 | /mnt/hostA/bin/test.exe |
| ... | ... |

FIG. 9A

| ID | CONNECTION PROTOCOL |
|---|---|
| 1001027 | mail |
| 1023421 | phone |
| 1025773 | video phone |
| 1087321 | text chat |

FIG. 9B

| ID | host name | user name |
|---|---|---|
| 0100021 | hostA | Alice |
| 0100382 | hostB | Bob |
| 0100981 | ----- | Carol |
| ... | ... | ... |

INFORMATION PROCESSING APPARATUS AND METHOD, COMMUNICATION PROCESSING APPARATUS AND METHOD, AND COMPUTER PROGRAM

BACKGROUND OF THE INVENTION

The present invention relates to an information processing apparatus and method, a communication processing apparatus and method, and a computer program. Specifically, the present invention relates to an information processing apparatus and method, a communication processing apparatus and method, and a computer program, in which it is determined whether or not an object, such as a book or card, exists in a sensor detecting area, so that the internal state of the information processing apparatus is changed according to the identified object. More specifically, the present invention relates to an information processing apparatus and method, a communication processing apparatus and method, and a computer program, in which startup/exit of an application program and connection/disconnection to/from network can be achieved according to an identified object.

Personal computers are rapidly becoming common in homes, owing to improved performance and lower cost of information processing apparatuses. Most of the personal computers adopt a graphical user interface (GUI) as an interface which is simple and intuitive. In a system using the GUI, a user can operate a computer by selecting an icon or menu with a mouse or pen tablet, instead of inputting a command with a keyboard.

However, even in such a system adopting the GUI as a user interface, users who are not familiar with a computer find it difficult to operate a computer. Considering these circumstances, an intuitive operationality which is friendly for every user has not been developed.

In order to develop an intuitive operationality which is friendly for more users, a real-world-oriented interface (a technique of achieving an intuitive computer operation by using a real physical object), has been studied.

An example of the real-world-oriented interface includes a bar code, two-dimensional code, or radio frequency identification (RFID) attached to a physical object. An RFID tag includes a silicon chip and an antenna used for wirelessly transmitting data. The RFID tag can be attached to any thing and is used as a transmission tag of identification data of an object. A number of RFID tags can be instantaneously read by an RF reader, if the RFID tags are within a detectable range of the RF reader. Such a system, in which ID information (for example, bar code, two-dimensional code, or RFID) is attached to an object so that a computer identifies the ID and performs processing according to the object having the ID, has been suggested.

For example, patent document 1 (Japanese Unexamined Patent Application Publication No. 2000-82107: "Image processing apparatus, image processing method, and medium") discloses an apparatus in which an application program corresponding to a code registered in advance is started by a two-dimensional code.

Also, in an apparatus disclosed in patent document 2 (Japanese Unexamined Patent Application Publication No. 2001-222433: "Information recording medium, information processing apparatus, information processing method, and a program recording medium"), data and a method of processing the data (application program starting method) are written into an optical code, the two-dimensional code is read by a code reader, and the data embedded in the code can be easily reproduced.

In a method disclosed in patent document 3 (Japanese Unexamined Patent Application Publication No. 8-69436: "Multimedia selecting/controlling apparatus and method of providing multimedia service"), a marker on an object is read by a scanner, and services provided through a network are switched according to the marker.

In each of the above-described known systems, identification of an ID, that is, recognition of a physical object, is used only for starting an application program and connecting to a network. That is, identification of an ID is used as a trigger for allowing a computer, in turn, to start a process.

In the above-described known arts, when a user wants to exit a currently-executed program in an information processing apparatus, such as a PC, he/she has to use a method which is not related to a physical object. That is, the user has to select an exit command from a menu or input a key for exit on a keyboard. Therefore, the user has to operate a keyboard or a mouse in order to exit a program. This method is not preferable in terms of the real-world-oriented interface, in which processing related to a physical object is performed by operating the physical object.

SUMMARY OF THE INVENTION

The present invention has been made in view of the above-described problems, whereby it is an object of the present invention to provide an information processing apparatus and method, a communication processing apparatus and method, and a computer program, in which a state of processing performed by an information processing apparatus, such as a computer, can be changed based on identification information of an object, so that an intuitive and consistent user interface and operation of the information processing apparatus can be achieved.

More specifically, it is object of the present invention to provide an information processing apparatus and method, a communication processing apparatus and method, and a computer program, in which various processing performed in an information processing apparatus including a PC, such as startup of an application program, parameter setting in an execution program, update of data, exit of a program, connection/disconnection to/from network, and change of connected party, can be performed based on identification information of the ID of an object input to the information processing apparatus or on recognition of presence of the object.

Further, it is another object of the present invention to provide an information processing apparatus and method, a communication processing apparatus and method, and a computer program, in which an intuitive operation can be achieved by performing identification of an ID corresponding to an object and identification of the object itself, and in which highly stable and robust control of state transition will result.

According to a first embodiment of the present invention, an information processing apparatus includes a sensor for detecting an object; an object-identifying unit which obtains an ID corresponding to the object based on information input from the sensor so as to repeatedly output the obtained ID based on the information input from the sensor; and an information processing unit which repeatedly receives the ID from the object-identifying unit so as to perform a program corresponding to the ID. The information processing unit compares a program that is set based on a newly-input ID with a program that is set based on an already-input ID from the object-identifying unit, and ends the currently-executed program when the two programs are different from each other.

The information processing unit compares the program that is set based on the newly-input ID with the program that is set based on the already-input ID from the object-identifying unit, and ends the currently-executed program so as to start the program that is set based on the newly-input ID when the two programs are different from each other.

The information processing apparatus may further include an ID/internal-state correspondence storage unit for storing a processing information table in which IDs to be obtained by the object-identifying unit are associated with paths of execution files. With this configuration, the information processing unit searches the ID/internal-state correspondence storage unit based on the ID input from the object-identifying unit so as to determine a program to be executed.

The sensor detects the object in a sensor effective area serving as an object recognizing area, the object-identifying unit outputs a special ID indicating absence of an object to the information processing unit when information received from the sensor does not include object information from which an ID can be obtained, and the information processing unit sets a next program to null based on the special ID.

The information processing unit starts an application program that is set based on the ID input from the object-identifying unit, compares an application program that is set based on the newly-input ID with an application program that is set based on the already-input ID from the object-identifying unit, and ends the currently-executed application program when the two application programs are different from each other.

According to another embodiment of the present invention, an information processing apparatus includes a sensor for detecting objects; an object-identifying unit which obtains first and second IDs corresponding to the objects based on information input from the sensor so as to repeatedly output the obtained IDs based on the information input from the sensor; and an information processing unit which repeatedly receives the IDs from the object-identifying unit so as to perform a program corresponding to the IDs. The information processing unit sets a communication protocol corresponding to the first ID input from the object-identifying unit and sets a connected party corresponding to the second ID input from the object-identifying unit. When at least one of a communication protocol and a connected party corresponding to first and second newly-input IDs from the object-identifying unit is different from at least one of a communication protocol and a connected party corresponding to first and second already-input IDs, the information processing unit changes the communication protocol or the connected party based on the corresponding newly-input ID.

The information processing apparatus may further include an ID/internal-state correspondence storage unit for storing a processing information table including data of correspondence between IDs to be obtained by the object-identifying unit and communication protocol information and data of correspondence between IDs to be obtained by the object-identifying unit and connected party information. The information processing unit searches the ID/internal-state correspondence storage unit based on the first and second IDs input from the object-identifying unit so as to obtain information of corresponding communication protocol and connected party.

The object-identifying unit includes an ID-determining unit for obtaining an ID corresponding to the object and an object presence determining unit for determining presence of the object in a sensor detecting area. The information processing unit controls processing based on ID information determined by the ID-determining unit and on presence determination information of the object determined by the object presence determining unit, ends the currently-executed program when the program corresponding to the newly-input ID based on ID information determined by the ID-determining unit is different from the program corresponding to the already-input ID and when the object presence determining unit determines absence of the object, and continues the currently-executed program when the program corresponding to the newly-input ID based on the ID information determined by the ID-determining unit is different from the program corresponding to the already-input ID and when the object presence determining unit determines presence of the object.

According to another embodiment of the present invention, a communication processing apparatus performing communication processing is provided. The apparatus includes a sensor for detecting objects; an object-identifying unit which obtains first and second IDs corresponding to the objects based on information input from the sensor so as to repeatedly output the obtained IDs based on the information input from the sensor; and an information processing unit which repeatedly receives the IDs from the object-identifying unit so as to perform a program corresponding to the IDs. The information processing unit sets a communication protocol corresponding to the first ID input from the object-identifying unit and sets a connected party corresponding to the second ID input from the object-identifying unit.

When at least one of a communication protocol and a connected party corresponding to first and second newly-input IDs from the object-identifying unit is different from at least one of a communication protocol and a connected party corresponding to first and second already-input IDs, the information processing unit changes the communication protocol or the connected party based on the corresponding newly-input ID.

According to another embodiment of the present invention, an information processing method includes an object identifying step of obtaining an ID corresponding to an object based on information input from a sensor, which detects the object, and repeatedly outputting the obtained ID to an information processing unit based on the information input from the sensor; and an information processing step of repeatedly receiving the ID obtained in the object identifying step and performing a program corresponding to the ID. In the information processing step, a program that is set based on a newly-input ID is compared with a program that is set based on an already-input ID, and the currently-executed program is ended when the two programs are different from each other.

In the information processing step, the program that is set based on the newly-input ID is compared with the program that is set based on the already-input ID, and the currently-executed program is ended so as to start the program that is set based on the newly-input ID when the two programs are different from each other.

In the information processing step, an ID/internal-state correspondence storage unit for storing a processing information table in which IDs are associated with paths of execution files is searched based on the input ID so as to determine a program to be executed.

The sensor detects the object in a sensor effective area serving as an object recognizing area. In the object identifying step, a special ID indicating absence of an object is output to the information processing unit when information received from the sensor does not include object information from which an ID can be obtained. Accordingly, in the information processing step, a next program is set to null based on the special ID.

In the information processing step, an application program that is set based on the input ID is started, an application program that is set based on the newly-input ID is compared with an application program that is set based on the already-input ID, and the currently-executed application program is ended when the two application programs are different from each other.

According to another embodiment of the present invention, an information processing method includes an object identifying step of obtaining first and second IDs corresponding to objects based on information input from a sensor, which detects the objects, and repeatedly outputting the obtained IDs to an information processing unit based on the information input from the sensor; and an information processing step of repeatedly receiving the IDs obtained in the object identifying step and performing a program corresponding to the IDs. In the information processing step, a communication protocol corresponding to the first ID is set and a connected party corresponding to the second ID is set. When at least one of a communication protocol and a connected party corresponding to first and second newly-input IDs is different from at least one of a communication protocol and a connected party corresponding to first and second already-input IDs, the communication protocol or the connected party is changed based on the corresponding newly-input ID.

In the information processing step, an ID/internal-state correspondence storage unit for storing a processing information table including data of correspondence between IDs and communication protocol information and data of correspondence between IDs and connected party information is searched based on the input first and second IDs so as to obtain information of corresponding communication protocol and connected party.

The object identifying step includes an ID determining step of obtaining an ID corresponding to the object; and an object presence determining step of determining presence of the object in a sensor detecting area. In the information processing step, processing is controlled based on ID information determined in the ID determining step and on presence determination information of the object determined in the object presence determining step. Also, the currently-executed program is ended when the program corresponding to the newly-input ID is different from the program corresponding to the already-input ID and when absence of the object is determined in the object presence determining step, and the currently-executed program is continued when the program corresponding to the newly-input ID is different from the program corresponding to the already-input ID and when presence of the object is determined in the object presence determining step.

According to another embodiment of the present invention, a communication processing method includes an object identifying step of obtaining first and second IDs corresponding to objects based on information input from a sensor, which detects the objects, and repeatedly outputting the obtained IDs to an information processing unit based on the information input from the sensor; and an information processing step of repeatedly receiving the IDs obtained in the object identifying step and performing a program corresponding to the IDs. In the information processing step, a communication protocol corresponding to the first ID is set and a connected party corresponding to the second ID is set.

In the information processing step, when at least one of a communication protocol and a connected party corresponding to first and second newly-input IDs is different from at least one of a communication protocol and a connected party corresponding to first and second already-input IDs, the communication protocol or the connected party is changed based on the corresponding newly-input ID.

According to another embodiment of the present invention, a computer program for executing information processing is provided. The program includes an object identifying step of obtaining an ID corresponding to an object based on information input from a sensor, which detects the object, and repeatedly outputting the obtained ID to an information processing unit based on the information input from the sensor; and an information processing step of repeatedly receiving the ID obtained in the object identifying step and performing a program corresponding to the ID. In the information processing step, a program that is set based on a newly-input ID is compared with a program that is set based on an already-input ID, and the currently-executed program is ended when the two programs are different from each other.

According to another embodiment of the present invention, a computer program for executing communication processing is provided. The program includes an object identifying step of obtaining first and second IDs corresponding to objects based on information input from a sensor, which detects the objects, and repeatedly outputting the obtained IDs to an information processing unit based on the information input from the sensor; and an information processing step of repeatedly receiving the IDs obtained in the object identifying step and performing a program corresponding to the IDs. In the information processing step, a communication protocol corresponding to the first ID is set and a connected party corresponding to the second ID is set.

According to the present invention, an ID corresponding to an object is obtained based on information input from a sensor for detecting the object, the obtained ID is continuously and repeatedly input to the information processing unit, and the information processing unit compares a program that is set based on a newly-input ID and a program that is set based on an already-input ID, so as to end the currently-executed program when the two programs are different from each other. With this configuration, by putting an object in a sensor effective area (for example, image-pickup range of a camera), a program corresponding to the ID of the object can be started. Also, by removing the object from the sensor effective area, the program corresponding to the ID of the object can be ended. Accordingly, a user can start/exit a program in the information processing apparatus only by performing a simple operation; that is, by putting an object associated with an ID in the sensor effective area or by removing the object from sensor effective area.

Also according to the present invention, two types of ID information can be obtained based on two types of objects, such as, a protocol card and a connected-party card, so as to set a communication protocol and a connected party. Accordingly, the user can start/end communication only by performing a simple operation; that is, by putting an object associated with an ID in the sensor effective area (for example, image-pickup range of a camera) or by removing the object from the sensor effective area. In addition, the user can change the communication protocol or the connected party by performing the simple operation.

Moreover, according to the present invention, the information processing apparatus is controlled based on obtaining of ID of an object and determination of presence of an object. Therefore, even when the ID of an object cannot be obtained, when presence of the object is determined, the currently-executed program is not ended. Accordingly, the currently-executed program is continued and ending of the program due to ID obtaining error does not occur. As a result, startup/exit of a program is not repeated frequently and, thus, highly-stable and robust control results.

The computer program of the present invention can be provided, in a computer-readable form, to a multi-purpose computer system for executing various program codes through storage medium or communication medium, such as CD, FD, MO, or network. By providing such a program in a computer-readable form, processing corresponding to the program can be affected in the computer system.

Further objects, features, and advantages of the present invention will become apparent from the following description of the preferred embodiments with reference to the attached drawings. In this specification, a system refers to a logical complex of a number of devices, with all the devices not necessarily being required in a case.

BRIEF DESCRIPTION OF THE DRAWINGS

FIG. 4 shows an example of a processing information table stored in an ID/internal-state correspondence storage unit of the information processing apparatus.

FIGS. 9A and 9B show examples of processing information tables stored in the ID/internal-state correspondence storage unit of the information processing apparatus of the second embodiment.

DETAILED DESCRIPTION OF THE INVENTION

Figure 1:
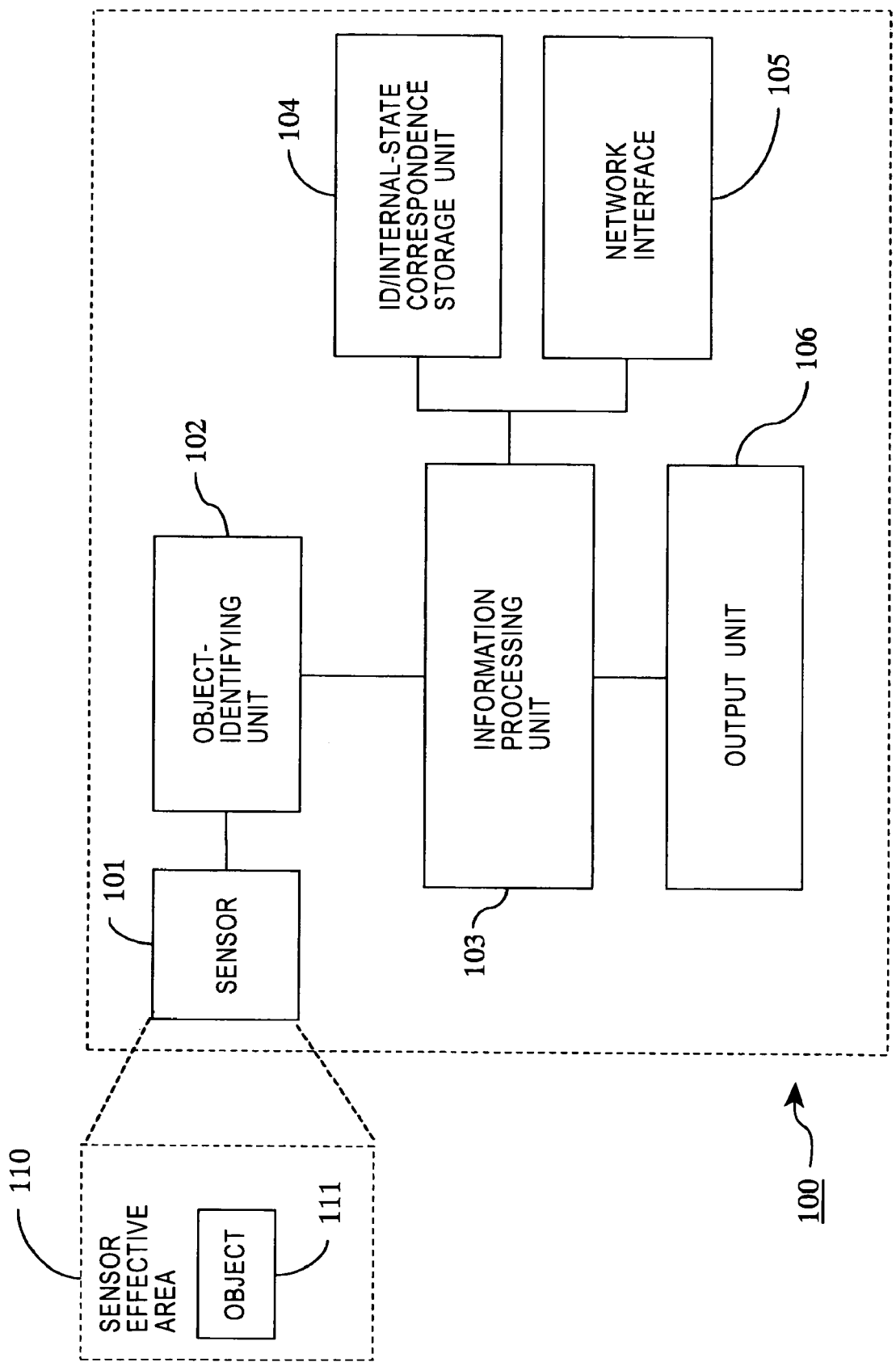
FIG. 1 is a block diagram showing the overview of an information processing apparatus of the present invention.

Hereinafter, embodiments of the present invention will be described with reference to the drawings. FIG. 1 is a block diagram showing the overview of an information processing apparatus of the present invention. A specific hardware structure thereof will be described later. An information processing apparatus 100 includes a sensor 101; an object-identifying unit 102; an information processing unit 103; an ID/internal-state correspondence storage unit 104; a network interface 105; and an output unit 106.

The sensor 101 determines whether or not an object 111 exists in a sensor effective area 110, which is a data obtaining area for the sensor 101. The object 111 may be any thing which can be detected by the sensor; for example, a book, a card, and a toy. An identifier (ID) is associated with each object, so that the sensor 101 detects the object 111.

The sensor 101 recognizes the object 111 and inputs recognition information to the object-identifying unit 102, which identifies ID information corresponding to the object 111. The information input from the sensor 101 to the object-identifying unit 102 is information by which the ID of the object can be identified.

For example, if an ID set to the object 111 is radio frequency identification (RFID), an RFID reader, serving as a radio reader which can receive transmission data from RFID, is used as the sensor 101. On the other hand, if the ID set to the object 111 is code data, such as a bar code or two-dimensional code, a camera serving as an image pickup unit which can read code data, or a camera serving simply as an image taking unit is used as the sensor 101. In this case, the object-identifying unit 102 may identify an ID based on an image of the object; thus, it is not necessary to attach code data or the like corresponding to the ID to the object.

The object-identifying unit 102 uses information from the sensor 101 so as to determine whether or not an object associated with an ID exists in the sensor effective area 110. For example, if the sensor 101 is an RFID reader, the sensor 101 reads some RFID. When the object-identifying unit 102 receives effective ID data from the sensor 101, the object-identifying unit 102 determines that an object exists. Otherwise, the object-identifying unit 102 determines that an object does not exist.

When the ID set to an object is code data, such as a two-dimensional code, and when the sensor 101 is a camera, an image taken by the camera is analyzed so as to determine presence of the object and to identify its ID. Alternatively, an image recognition method may be used instead of a special code, so as to identify the ID corresponding to an object based on shape information or color information of the object.

Further, the object-identifying unit 102 can perform a process of determining presence of an object, as well as a process of identifying an ID. That is, even if an ID cannot be identified, presence of an object may be determined. In such a case, the information processing apparatus 100 performs a process based on information indicating that an object exists. When an ID cannot be identified but when presence of an object can be determined, then it is determined that the object having the ID which has been previously identified continuously exists. In this case, processing state of the information processing apparatus 100 can be set to a state where an ID continuously exists, and thus the information processing apparatus 100 can be stably controlled and robustness of the control can be enhanced. Details of this process will be described later.

The object-identifying unit 102 outputs an identified ID of an object or information indicating presence of the object to the information processing unit 103. The information processing unit 103 changes the internal state thereof based on the identified ID of the object or the information indicating presence of the object. Transition of the internal state refers to, for example, startup/exit of application, setting/change of parameters of an executed program in the application, and connection/disconnection to/from network and setting/change of address when a processed program is data communication processing. These processes can be executed in the information processing unit 103.

State transition in the information processing unit 103 is performed based on correspondence data of IDs and the internal states of the information processing apparatus 100, the correspondence data being recorded in the ID/internal-state correspondence storage unit 104. The ID/internal-state correspondence storage unit 104 stores a processing information table indicating correspondence between IDs of objects and state information of the information processing apparatus to be set in accordance with each ID. A specific example of the processing information table will be described later.

The output unit 106 outputs a result of information processing performed by the information processing unit 103. The output unit 106 includes, for example, a display and a speaker. When the information processing apparatus 100 has a communication processing function, the network interface 105 is provided therein, so that communication is performed through the Internet or a LAN. The output unit 106 and the network interface 105 are provided in accordance with processing performed by the information processing apparatus 100, and they are not always necessary.

Next, specific examples of processing performed by using the information processing apparatus shown in FIG. 1 will be described. Herein, the following three embodiments are described.

(1) Process of starting/exiting an application program
(2) Process of connecting/disconnecting to/from network
(3) Process for enhancing robustness based on determination of presence of an object

FIRST EMBODIMENT

Process of Starting/Exiting an Application Program

First, a process of starting/exiting an application program will be described as a first example of a process to which the information processing apparatus and the information processing method of the present invention are applied.

Figure 2:
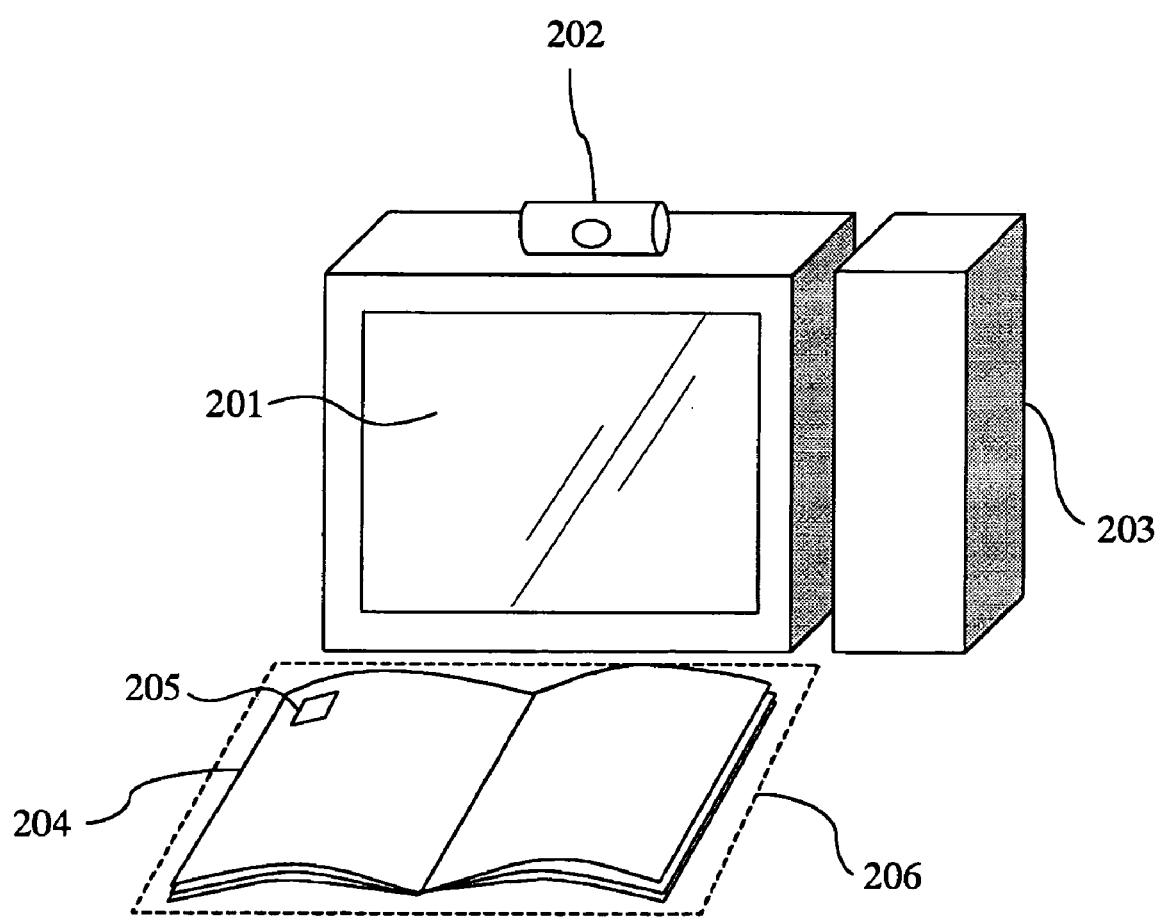
FIG. 2 shows the system structure of an information processing apparatus according to a first embodiment of the present invention.

FIG. 2 shows an example of the system structure of the information processing apparatus used for performing this embodiment. In this system, a camera 202 provided on a display 201 functions as a sensor, and takes an image of the area in front of the display 201. A predetermined area in front of the display 201, or the area which can be taken by the camera 202, is set as an image-pickup range 206 corresponding to the sensor effective area.

A data processing unit 203 includes the elements shown in FIG. 1 except the sensor 101 (corresponding to the camera 202) and the output unit 106 (corresponding to the display 201); that is, the object-identifying unit 102, the information processing unit 103, and the ID/internal-state correspondence storage unit 104 of the information processing apparatus 100 shown in FIG. 1. Since communication processing through a network is not performed in this embodiment, the data processing unit 203 may not include the network interface 105.

Figure 3:
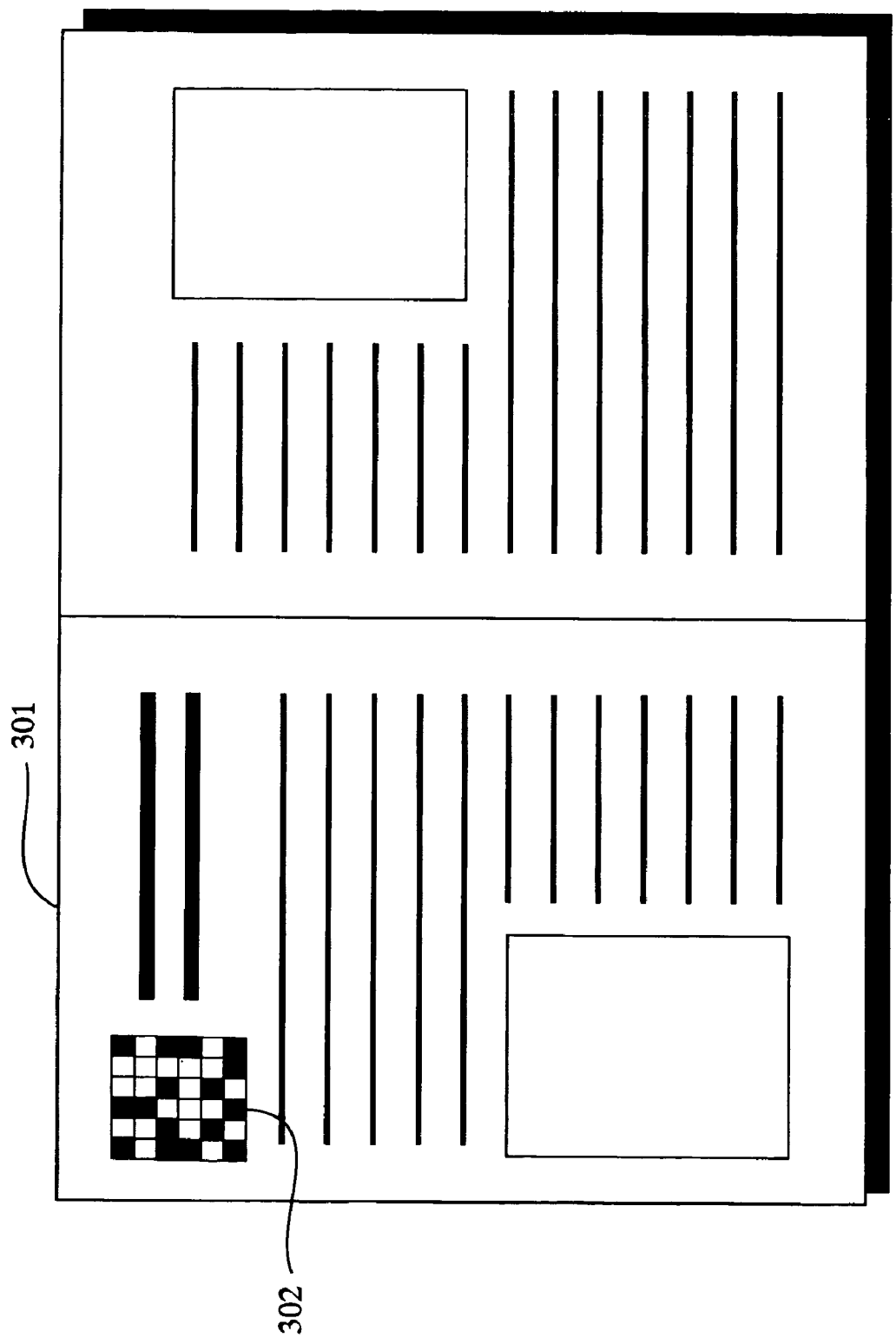
FIG. 3 shows an example of a book, serving as an object applied to the information processing apparatus of the first embodiment.

As an example of an object, a book 204 is used. A two-dimensional code 205 corresponding to an identifier (ID) is printed on a page of the book 204. FIG. 3 shows an example of a page of the book used in the system shown in FIG. 2. In a book 301, a two-dimensional code 302 is printed in an area of each page. As the two-dimensional code, a code which can be adequately identified based on its image taken by a camera is preferably used, such as a cyber code or a QR code.

The cyber code is a form of two-dimensional code, which is disclosed in Japanese Unexamined Patent Application Publication No. 2000-82108 ("Two-dimensional code identifying/processing method, two-dimensional code identifying/processing apparatus, and medium"), which has been assigned to the applicant of the present application. The QR code is also a form of two-dimensional code, which is standardized as ISO/IEC18004.

Another type of two-dimensional code other than the cyber code and the QR code may be applied. Further, a one-dimensional code, such as a bar code, may also be used as a code indicating an identifier (ID).

A user of the information processing apparatus puts the book 204 in the image-pickup range 206 for the camera 202, which serves as a sensor, as shown in FIG. 2. Accordingly, the ID of the two-dimensional code 205 printed on a page of the book 204 is obtained by the camera 202, the data processing unit 203 identifies the ID, an application program corresponding to the identified ID is started, and an execution result of the application program executed by the data processing unit 203 is displayed in the display 201, which serves as the output unit.

When the user removes the book 204 from the image-pickup range 206 for the camera 202, the ID of the two-dimensional code 205 printed on the page of the book 204 cannot be obtained by the camera 202. In this case, the data processing unit 203 determines that ID information is not input, and then exits the application program which is being executed in accordance with the ID which has been previously identified. In this way, the application program being executed by the data processing unit 203 exits automatically. The details of this process will be described later.

In this embodiment, the camera is used as the sensor 101 shown in FIG. 1, and the object-identifying unit 102 processes an image so as to recognize a two-dimensional code. The object-identifying unit 102 identifies an ID corresponding to the two-dimensional code. Also, the information processing unit 103 selects, executes, and exits an application program based on the input state of the identified ID.

In order to select and execute an application program, the information processing unit 103 searches the ID/internal-state correspondence storage unit 104 based on the ID received from the object-identifying unit 102, so as to obtain information of a program to be executed. The ID/internal-state correspondence storage unit 104 stores a processing information table including IDs and paths of programs corresponding to the IDs.

FIG. 4 shows an example of the structure of the processing information table, which is stored in the ID/internal-state correspondence storage unit 104. As shown in FIG. 4, identifiers (IDs) to be read from objects by a sensor and paths of programs to be executed in accordance with the IDs are recorded in the processing information table. For example, when an ID: 001012 is read from an object and is input from the object-identifying unit 102 to the information processing unit 103, the information processing unit 103 searches the table stored in the ID/internal-state correspondence storage unit 104 for a program to be executed based on the ID: 001012.

In the ID/internal-state correspondence storage unit 104, table search is performed based on the ID: 001012, and then the information processing unit 103 obtains a search result; that is, a path of execution file: /usr/local/bin/game.exe. Then, the information processing unit 103 starts a game execution program which is specified by the path: /usr/local/bin/game.exe.

When the book 204 shown in FIG. 2 is removed from the image-pickup range 206 of the sensor (camera 202), the information of the two-dimensional code 205 disappears from image data in the sensor (camera 202), and thus input of the ID: 001012 from the object-identifying unit 102 to the information processing unit 103 is interrupted. In accordance with the interruption of input of the ID, the information processing unit 103 exits the game execution program which is specified by the execution file path: /usr/local/bin/game.exe, which is being executed in accordance with the ID: 001012.

Figure 5:
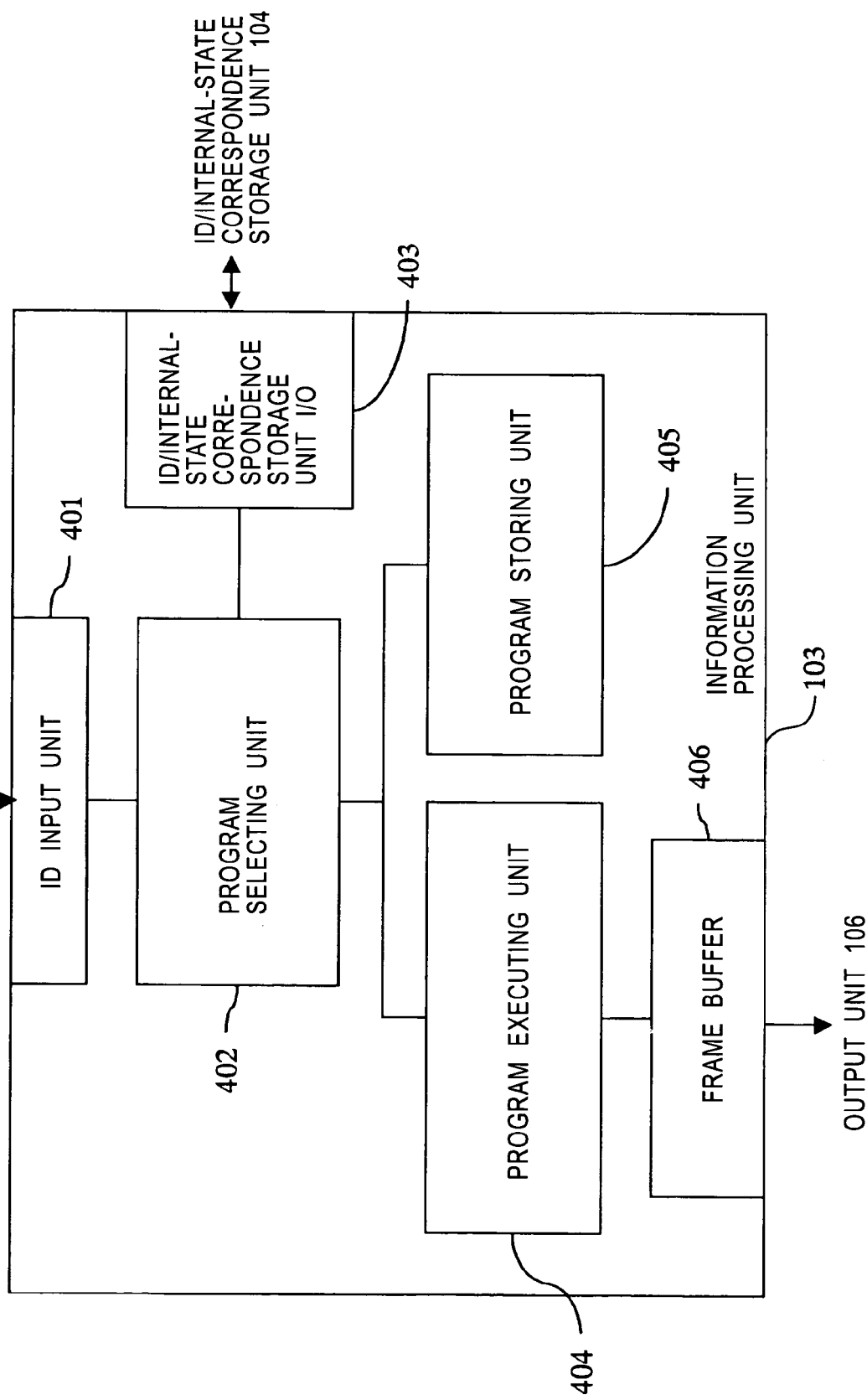
FIG. 5 shows an example the configuration of an information processing unit of the information processing apparatus.

FIG. 5 shows a specific configuration of the information processing unit 103 according to this embodiment. A program selecting unit 402 obtains an ID from the object-identifying unit 102 (see FIG. 1) through an ID input unit 401 and outputs the ID to the ID/internal-state correspondence storage unit 104 through an ID/internal-state correspondence storage unit I/O 403, so as to request an application program to be executed. Then, the program selecting unit 402 receives an execution file path corresponding to the ID from the ID/internal-state correspondence storage unit 104, so as to allow a program executing unit 404 to execute a program specified by the path.

The program executing unit 404 loads a file to be executed, which is specified by the program execution file path obtained from the ID/internal-state correspondence storage unit 104 based on the ID, from a program storing unit 405, and then executes the program. The result of the program processing executed by the program executing unit 404 is written into a frame buffer 406, and is presented to the user through the display (201) of the output unit 106.

Figure 6:
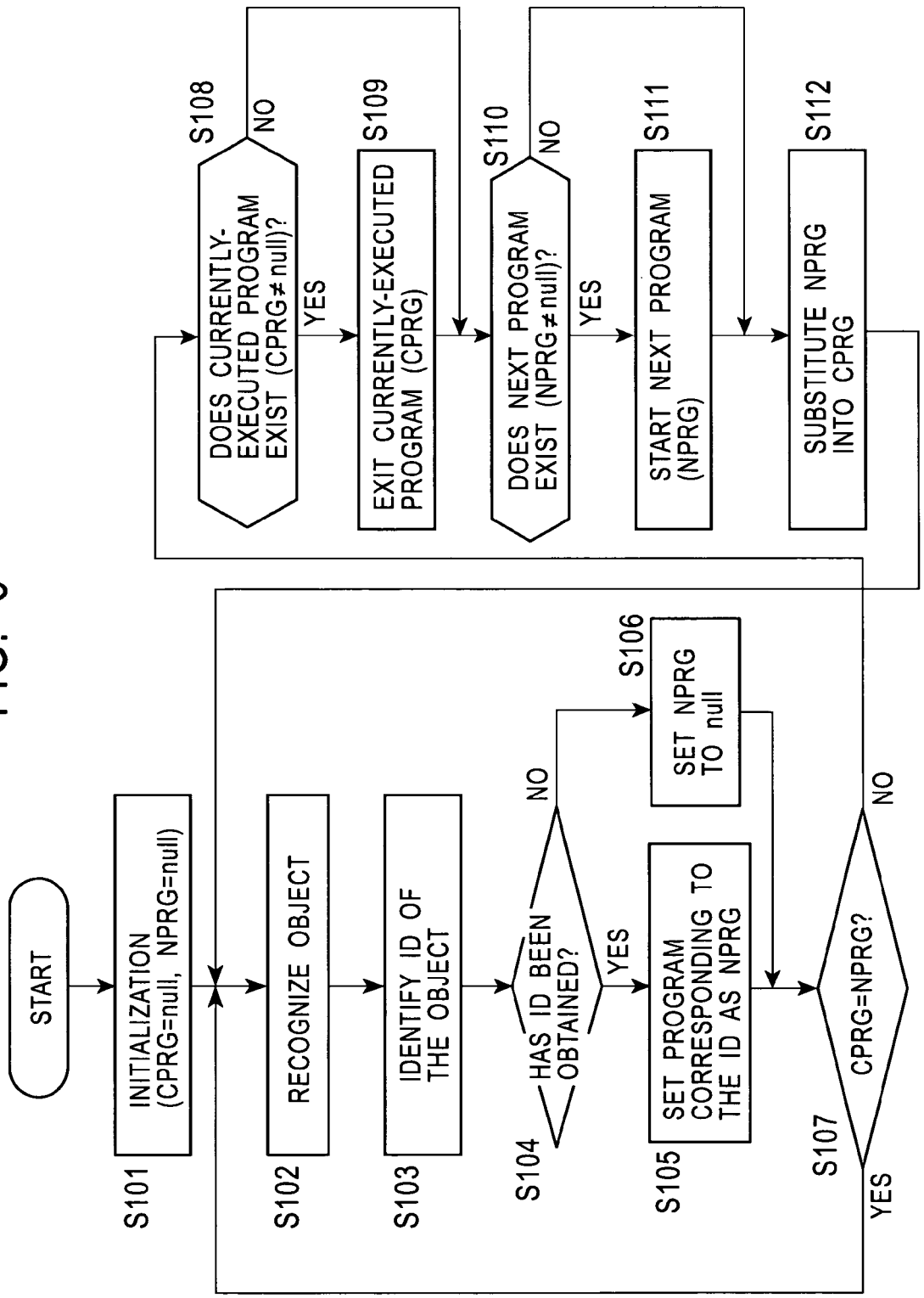
FIG. 6 is a flowchart of a process performed by the information processing apparatus of the first embodiment.

Now, a process performed by the information processing unit of the information processing apparatus in this embodiment, that is, a process of executing/exiting a program based on an identified ID of an object, will be described with reference to the flowchart shown in FIG. 6.

First, in step S101, a string "CPRG" indicating the path of a currently-executed program and a string "NPRG" indicating the path of a program to be executed next are set to null strings (for example, "null") so as to perform initialization. When the null string "null" is set, an ineffective special path may be set, the path being regarded as null.

Then, in step S102, an object is recognized. In this step, an image of the image-pickup range 206 taken by the camera 202 shown in FIG. 2 is input to the object-identifying unit 102 in the data processing unit 203. In step S102, only presence/absence of an object is determined. At this time, when a number of objects are recognized, an object is selected based on an appropriate standard. The standard may be likelihood output by a recognition algorithm (residual generated when matching is performed or likelihood in statistical estimation), or the position of a recognized object. For example, an object which is the closest to the display may be selected. Accordingly, an object is selected.

Then, in step S103, the ID of the recognized object is identified. In this step, the image of the image-pickup range 206 taken by the camera 202 shown in FIG. 2 is input to the object-identifying unit 102 in the data processing unit 203, and then the input image is analyzed, as in step S102. For example, a two-dimensional code is extracted from the obtained image, and an ID serving as identification data is obtained based on the two-dimensional code. When an object is not recognized, a special ID (for example, ID of all-0) indicating that an object is not recognized may be set in the object-identifying unit 102, so that the special ID may be output to the information processing unit 103.

In step S104, it is determined whether or not the ID has been obtained. If the ID has not been obtained, for example, if a special ID of all-0 has been output from the object-identifying unit 102 to the information processing unit 103, next program (NPRG) is set to null in step S106. NPRG=null means that a next program is not set.

If it is determined that the ID has been obtained in step S104, a next program determined based on the ID is set as NPRG in step S105. That is, the information processing unit 103 shown in FIG. 1 searches the table stored in the ID/internal-state correspondence storage unit 104 based on the ID information input from the object-identifying unit 102, obtains path information of a program, and sets a string indicating the name of the obtained path to NPRG. As a result, the path of the next program is set as NPRG.

In step S107, it is determined whether or not the current program (CPRG) is the same as the next program (NPRG). When CPRG=NPRG, the process returns to step S102, so that the object recognizing step and ID identifying step are performed again. That is, the ID identifying step is repeated while continuing the current program.

When it is determined that the current program (CPRG) is different from the next program (NPRG) in step S107, the process proceeds to step S108. In step S108, it is determined whether or not the current program (CPRG) exists. That is, it is determined whether CPRG≠null or CPRG=null. When the current program (CPRG) exists (CPRG≠null), the current program (CPRG) is exited in step S109.

This step is performed in order to exit the current program (CPRG) and to start the next program (NPRG), because it has been determined that the current program (CPRG) is different from the next program (NPRG). That is, an object having a new ID has been detected or that input of the previously detected ID has been interrupted (the object having the previously detected ID has been removed from the sensor effective area).

When it is determined that a current program (CPRG) does not exist (CPRG=null) in step S108, a program is not executed currently, and thus the process jumps to step S110.

In step S110, it is determined whether the next program (NPRG) has been set (NPRG≠null) or not (NPRG=null). When the next program (NPRG) has been set (NPRG≠null), the process proceeds to step S111, where the next program is started by obtaining an NPRG setting file in accordance with the path set to the next program (NPRG). This is a program corresponding to the ID of a newly-detected object.

When it is determined that a next program (NPRG) does not exist (NPRG=null) in step S110, a next program is not set, and thus the process jumps to step S112. In step S112, the set value of the next program (NPRG) is substituted into the set value of the current program (CPRG), and then the process returns to step S102.

As described above, in the system structure shown in FIG. 2, a program corresponding to the ID set in accordance with an object is started by putting an object (for example, a book) in the sensor effective area (image-pickup range for a camera). Also, by putting an object (for example, a book) outside the sensor effective area (image-pickup range for a camera), input of the ID is interrupted. In this case, NPRG is set to null in step S106 in the flowchart shown in FIG. 6, "CPRG=NPRG" is denied (No) in step S107, it is determined that a currently executed program exists in step S108, and then the current program (CPRG) is exited in step S109.

In this way, the user can start or exit a program in the information processing apparatus only by performing a simple operation; by putting an object associated with an ID in the sensor effective area (image-pickup range for a camera) or by removing the object from the sensor effective area.

In the above-described embodiment, a currently-executed program (CPRG) or a next program (NPRG) is represented by a string indicating the path of the program; that is, CPRG=path name and NPRG=path name. Instead of directly setting a path name, an ID obtained by the sensor may be held as a program state value, that is, CPRG=identified ID and NPRG=identified ID, and the path of a program to be executed may be searched for by using Hash method or table search based on the ID.

Next, a process performed when a currently-executed program abends will be described. In the process described with reference to FIG. 6, when a program abends, the set value (for example, path name) of the current program (CPRG) is not updated, and thus a state where the program has been ended is maintained.

In order to prevent such a state, the program selecting unit 402 in the information processing unit 103 shown in FIG. 5 monitors a started program. When the program selecting unit 402 detects abend of a program, it updates the set value of the current program (CPRG); that is, CPRG is set to null. By performing this setting, when the sensor detects a new ID, it is determined that CPRG≠NPRG in step S107, it is determined that CPRG=null in step S108, and then it is determined that NPRG≠null in step S110 in FIG. 6. Then, in step S111, a next program (NPRG) corresponding to the path name obtained based on the ID is started, and thus the abended program can be restarted.

A method of detecting abend of a program in the program selecting unit 402 is different depending on the data processing environment (operating system) of the information processing apparatus. For example, in UNIX, abend of a program can be detected by executing wait ( ) on a process obtained by executing fork ( ). Also, in Windows, the end of a process can be notified as an event. A result of program monitoring process of the OS is input to the program selecting unit 402 (see FIG. 5), and in accordance with the input, the set value of the current program (CPRG) is updated.

SECOND EMBODIMENT

Process of Connecting/Disconnecting to/from Network

Next, a process of connecting/disconnecting to/from a network in a communication processing apparatus will be described as a second example of a process to which the information processing apparatus and the information processing method of the present invention are applied.

Figure 7:
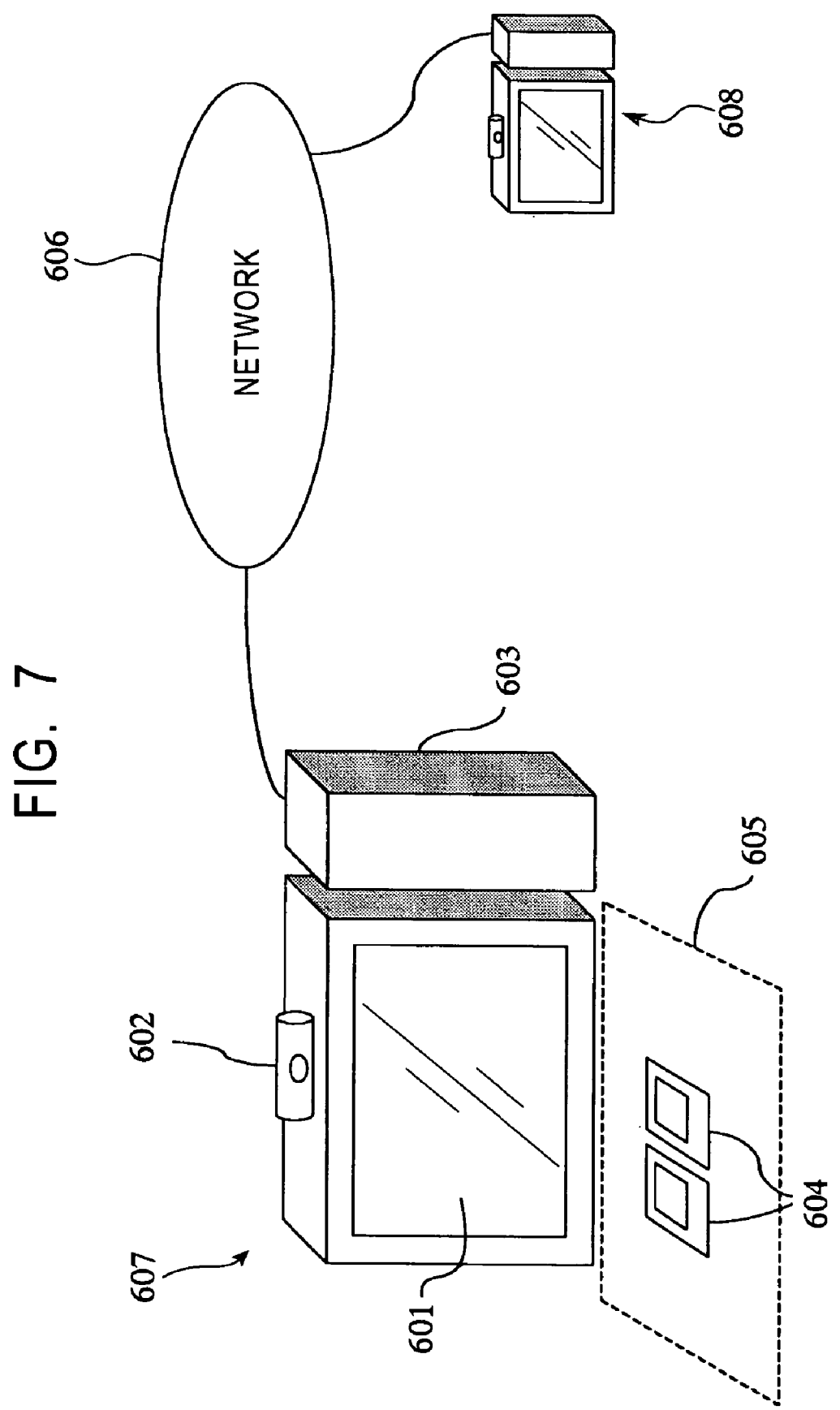
FIG. 7 shows the system structure of an information processing apparatus according to a second embodiment of the present invention.

FIG. 7 shows an example of the system structure of the information processing apparatus used for performing this embodiment. In this system, a camera 602 provided on a display 601 functions as a sensor, and takes an image of the area in front of the display 601. A predetermined area in front of the display 601, which can be taken by the camera 602, is set as an image pickup range 605 corresponding to the sensor effective area.

A data processing unit 603 includes the elements shown in FIG. 1 except the sensor 101 (corresponding to the camera 602) and the output unit 106 (corresponding to the display 601); that is, the object-identifying unit 102, the information processing unit 103, the ID/internal-state correspondence storage unit 104, and the network interface 105 of the information processing apparatus 100 shown in FIG. 1.

In this embodiment, cards 604 are used as objects. The cards are an example of an object, and another object may also be applied. In order to recognize the cards 604, an image taken by the camera 602 on the display 601 is used. Further, a client A (607) including the display 601, the camera 602, and the data processing unit 603 is connected to a network 606 through the network interface included in the data processing unit 603, and the client A (607) can be connected to another client B (608) through the network 606.

Figure 8:
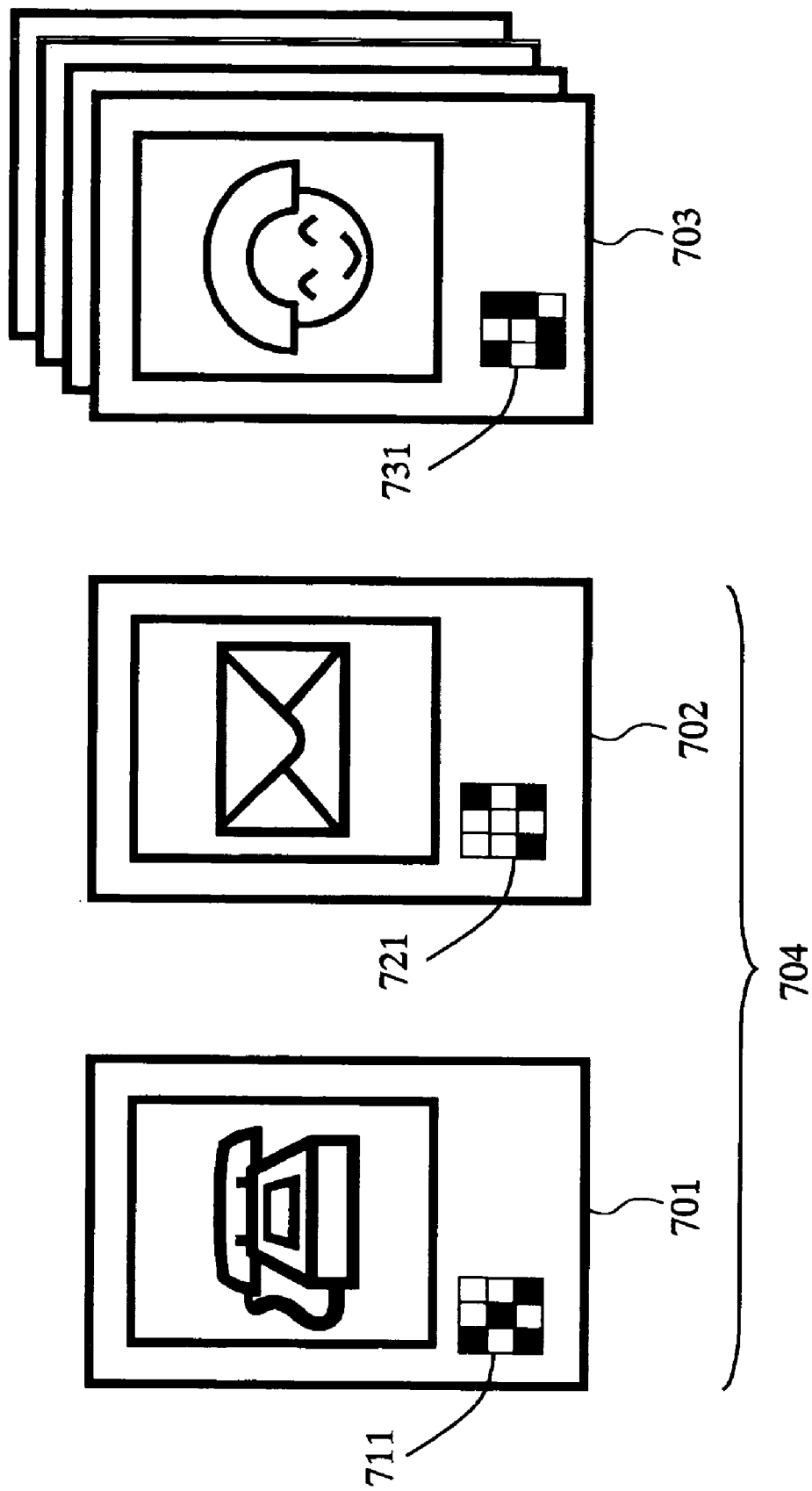
FIG. 8 shows examples of a protocol card and a connected-party card, serving as objects applied to the information processing apparatus of the second embodiment.

FIG. 8 shows an example of the cards as objects. In this embodiment, a user can be connected to another user (connected party) by using a desired method (communication protocol) through the network by putting cards in front of the display. Two-dimensional codes 711, 721, and 731 indicating identifiers are printed on the surfaces of the cards, respectively. In FIG. 8, a two-dimensional code is used as a card identifier. However, the identifier data may be data corresponding to an RF tag or a bar code, instead of the two-dimensional code. Alternatively, image information, such as a picture of a telephone or mail, may be used as identification information instead of code information, as shown in FIG. 8.

Cards used in this embodiment include two types of cards; a protocol card 704 used for setting a connecting method, such as a voice conversation card 701 and a mail card 702, and a connected-party card 703 used for setting a connected party.

For example, when a user performs voice communication with user A, he/she uses the voice conversation card as a protocol card and an A card as a connected-party card. Also, when the user transmits a mail to user B, he/she uses the mail card as a protocol card and a B card as a connected-party card.

When the user wants to perform voice conversation with another user, he/she puts the voice conversation card and a connected-party card on which a desired party's face is printed in the image-pickup range 605 in front of the display 601 in FIG. 7. Then, the camera 602 takes an image of the two cards. After that, the object-identifying unit 102 shown in FIG. 1 obtains identification information (IDs) of the cards, and the identification information (IDs) is output to the information processing unit 103, which performs processing in accordance with the identification information. In this case, a communication protocol is set, and also a connected party on the set protocol, that is, processing parameters including address and telephone number are set, based on the identification information of the two category cards.

In order to set a protocol and a connected party, the information processing unit 103 searches tables stored in the ID/internal-state correspondence storage unit 104 based on the IDs input from the object-identifying unit 102, so as to obtain information of a program to be executed. The ID/internal-state correspondence storage unit 104 stores processing information tables including IDs and paths of programs corresponding to the IDs.

FIGS. 9A and 9B show examples of the configuration of the processing information tables stored in the ID/internal-state correspondence storage unit 104. As shown, two types of tables exist: a processing information table for setting a protocol (FIG. 9A); and a processing information table for setting a connected party (FIG. 9B).

In the processing information table used for setting a protocol shown in FIG. 9A, identifiers (IDs) to be read from objects by a sensor and connection protocol information to be executed in accordance with the IDs (mail, telephone, etc.) are set. On the other hand, in the processing information table used for setting a connected party shown in FIG. 9B, identifiers (IDs) to be read from objects by a sensor, and host names and user names, which are connected-party information to be set in accordance with the IDs, are set. When both of a host name and a user name are given, the user is connected to a specified user of a specified host. When only a user name is given, a host of the user is searched for in a database of a server, and then connection is performed to the host obtained from the database.

As shown in FIGS. 9A and 9B, the processing information table used for setting a protocol and the processing information table used for setting a connected party are separated. However, when IDs that are set to the protocol cards do not overlap IDs that are set to the connected-party cards, the processing information tables stored in the ID/internal-state correspondence storage unit 104 may be combined. In the example shown in FIGS. 9A and 9B, upper two digits of IDs corresponding to the protocol cards are 10 (FIG. 9A), while upper two digits of IDs corresponding to the connected-party cards are 01 (FIG. 9B). When the upper two digits of an ID are 10, the ID represents protocol (PRT), and when the upper two digits of an ID are 01, the ID represents connected party (CON). Therefore, the type of card can be determined based on the upper two digits of the ID. Details of ID information structure will be described later.

For example, when two IDs: 1001027 and 0100021, are read from objects, and when the IDs are input from the object-identifying unit 102 to the information processing unit 103, the information processing unit 103 outputs the IDs to the ID/internal-state correspondence storage unit 104 so as to request processing based on the IDs. In the ID/internal-state correspondence storage unit 104, table search is performed based on the ID: 1001027, and then connection protocol information (mail) is output to the information processing unit 103. Further, in the ID/internal-state correspondence storage unit 104, table search is performed based on the ID: 0100021, and information of a connected party (host A/Alice) is output to the information processing unit 103.

The information processing unit 103 sets mail as a connection protocol and also sets host A/Alice as a connected party, so that communication with Alice by mail can be performed.

When the user wants to disconnect communication which is being performed, he/she removes the cards from the image-pickup range in front of the display, as in the first embodiment. When the cards 604 shown in FIG. 7 are removed from the image-pickup range 605 for the sensor (camera 602), the cards disappear from image data in the sensor (camera 602), and thus input of the IDs from the object-identifying unit 102 to the information processing unit 103 shown in FIG. 1 is interrupted. In accordance with the interruption of input of the IDs, the information processing unit 103 ends the communication processing which is currently being executed in accordance with the IDs.

When a connected party does not respond to voice conversation and when the user wants to transmit a message to the party by mail, the user replaces the voice conversation card by the mail card. In this embodiment, a camera is used as the sensor 101 in FIG. 1. Therefore, the sensor effective area 110 shown in FIG. 1 is the image-pickup range for the camera. Also, cards of various pictures are used as the object 111. In this case, the object-identifying unit 102 obtains an ID corresponding to each card by identifying a picture on the card based on a code on the card or by image recognition.

The information processing unit 103 searches the ID/internal-state correspondence storage unit 104 based on the identified IDs of the cards, sets a protocol and a connected party based on the search result, and performs network connection through the network interface 105. Also, the result of the processing is presented to the user through the display 601 shown in FIG. 7 or a speaker (not shown), which serve as the output unit 106.

Now, a process performed by the information processing unit of the information processing apparatus of this embodiment, that is, a process of communication performed by setting a communication protocol and a connected party based on identified IDs of objects, will be described with reference to the flowcharts shown in FIGS. 10 to 12.

In this process, the following variables are used.
ID_QUEUE: queue for storing IDs detected based on cards
ID_TYPE: type information indicating the type of card (protocol card or connected-party card) in ID information
ID_DATA: data information indicating specific information of protocol or connected party in ID information
PDATA: information indicating a currently-set protocol
CDATA: information indicating a currently-connected party
CFLG: flag information indicating whether or not connection information has been changed As described above, two types of cards (protocol card and connected-party card), are used so as to set a communication protocol and a connected-party, in this embodiment. Thus, the information processing unit 103 shown in FIG. 1 performs processing by using these two pieces of information. The information processing unit 103 stores an ID received from the object-identifying unit 102 in the ID_QUEUE in the information processing unit 103. Specific protocol and connected-party information can be obtained from the ID/internal-state correspondence storage unit 104 based on IDs.

Figure 13:
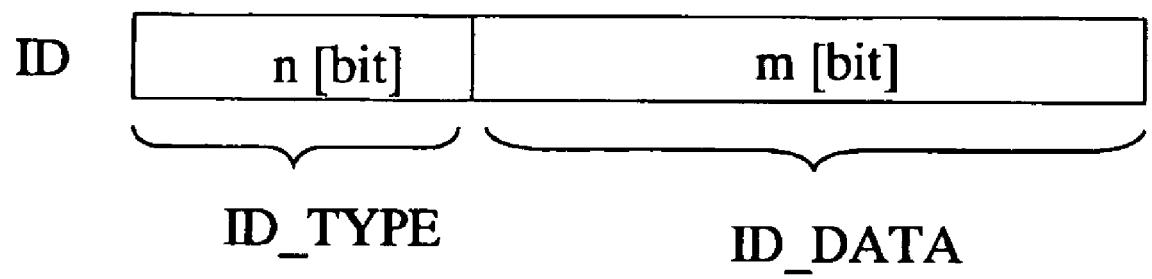
FIG. 13 shows an example the structure of ID information in the second embodiment.

The information processing unit 103 obtains specific information of a communication protocol and a connected party from the ID/internal-state correspondence storage unit 104 based on IDs received from the object-identifying unit 102, sets ID information based on the obtained information, and stores the ID information in a memory. FIG. 13 shows a data structure of ID information stored in the memory in the information processing unit 103. ID information includes type information (ID_TYPE) indicating the type of a card (protocol card or connected-party card) and data information (ID_DATA) indicating specific information of protocol or connected party in the ID information.

In the ID information, upper n bit is used for ID_TYPE and lower m bit is used for ID_DATA. As the value of ID_TYPE, any of a value indicating a protocol (PRT) and a value indicating a connected party (CON) is set. When ID_TYPE is PRT, a value indicating a type of connecting method, such as voice telephone, mail, or video chat, is stored as ID_DATA.

When ID_TYPE is CON, IP address, host name, and nickname of the connected party are stored as ID_DATA. When a nickname is stored, the IP address of a machine to be connected is obtained by searching a database server based on the nickname.

A specific sequence of connection/disconnection of communication in this embodiment will be described with reference to FIGS. 10 to 12. FIG. 10 shows an entire sequence of connection/disconnection of communication in this embodiment. FIG. 11 shows a specific sequence of checking update of connection information in step S203 in FIG. 10. FIG. 12 shows a specific sequence of updating a network state in step S204 in FIG. 10.

Figure 10:
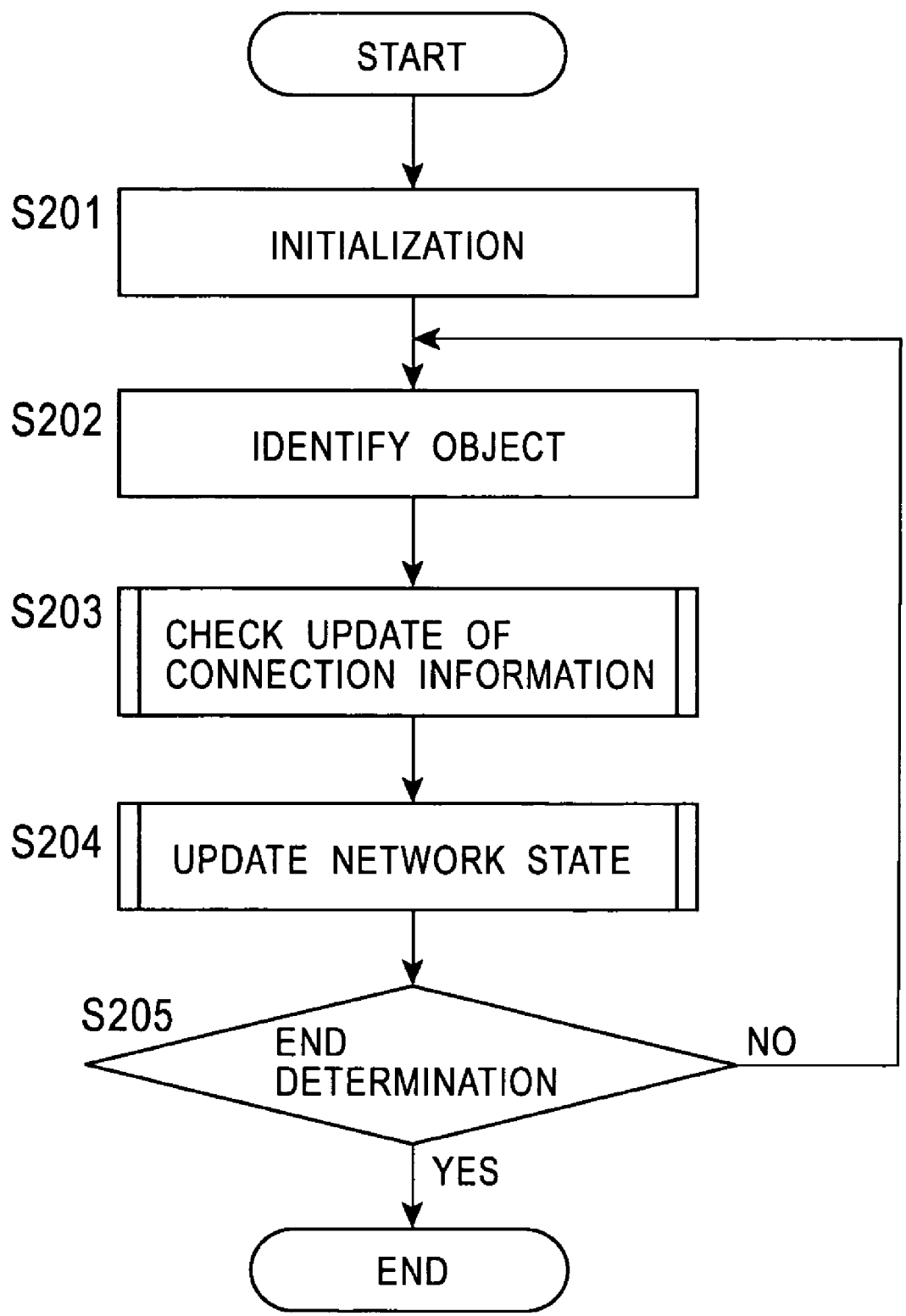
FIG. 10 is a flowchart of a process performed by the information processing apparatus of the second embodiment.

First, in step S201 in FIG. 10, variables used in this process are initialized. In the initialization, a queue for storing ID information obtained based on cards (ID_QUEUE) is emptied, information indicating a currently-set protocol (PDATA) and information indicating a currently-connected party (CDATA) are set to null, and flag information (CFLG) indicating whether or not connection information has been changed is set to OFF (false).

Then, in step S202, objects are identified and all IDs corresponding to the objects are stored in the ID_QUEUE. The IDs are obtained by the object-identifying unit 102 shown in FIG. 1 based on image information input from the sensor 101. Each ID may be obtained based on code information, such as a bar code or a two-dimensional code. Alternatively, the ID may be obtained based on a picture of a telephone or mail, by matching an image taken by a camera and a prepared template image. Each obtained ID is output to the information processing unit 103 shown in FIG. 1, and the information processing unit 103 stores the IDs in the obtained ID information storing queue (ID_QUEUE), which serves as a data storage unit.

When a number of cards of the same ID_TYPE, that is, a number of protocol cards or a numbered of connected-party cards, are recognized, a high priority is given to a card of the same value as the current ID_DATA in each ID_TYPE, and the card is stored in the obtained ID information storing queue (ID_QUEUE). That is, the ID of one of the protocol cards and the ID of one of the connected-party cards can be stored in the obtained ID information storing queue (ID_QUEUE).

When a protocol card or a connected-party card does not exist in the sensor effective area, the object-identifying unit 102 shown in FIG. 1 outputs information indicating that fact as obtained ID information to the information processing unit 103. For example, the upper digits of the ID information indicating a protocol card is 10 and the upper digits of the ID information indicating a connected-party card is 01. In this case, when a protocol card does not exist, the object-identifying unit 102 outputs a special ID: 1000000, in which all lower digits are 0, to the information processing unit 103, and when a connected-party card does not exist, the object-identifying unit 102 outputs a special ID: 0100000, in which all lower digits are 0, to the information processing unit 103. The information processing unit 103 stores these IDs in the queue (ID_QUEUE).

Then, in step S203, update of connection information is checked. In this step, the IDs identified in step S202 are compared with information of a current network connection, so as to determine whether or not the network connection state should be changed. Then, in step S204, the network connection state is changed, if necessary, based on the result of step S203. Finally, in step S205, end determination is performed. When a process is continued based on ID identification, the process returns to step S202.

Next, "check update of connection information" in step S203 will be described in detail with reference to FIG. 11. First, in step S301, it is checked whether or not the obtained ID information storing queue (ID_QUEUE) is empty. If the queue is empty, the subroutine is completed.

If an ID exists in the obtained ID information storing queue (ID_QUEUE), the process proceeds to step S302. In step S302, an ID is taken from the top of the obtained ID information storing queue (ID_QUEUE), specific information of a protocol or a connected party is obtained from the ID/internal-state correspondence storage unit 104 based on the ID, and a type and data based on the obtained information are set as ID_TYPE and ID_DATA, respectively. By taking the ID from the queue (ID_QUEUE), a space for storing an ID can be obtained, and thus a new ID can be stored in the queue.

At this time, when a card exists in an image taken by the sensor (camera) and when a card ID of the same type (protocol or connected party) as that of the ID taken from the queue is read, that ID is stored in the obtained ID information storing queue (ID_QUEUE). For example, when a protocol card continuously exists in the sensor effective area, the ID information of the same protocol is stored immediately after an ID is obtained from the obtained ID information storing queue (ID_QUEUE).

Also, when a connected-party card continuously exists in the sensor effective area, the ID information of the same connected party is stored immediately after an ID is obtained from the obtained ID information storing queue (ID_QUEUE).

Then, in step S303, it is determined whether or not the ID_TYPE is PRT (protocol information). If the ID_TYPE is protocol information, the process proceeds to step S304; otherwise, the process proceeds to step S306.

In step S304, it is determined whether PDATA, which is information indicating a currently-set protocol, is the same as ID_DATA, which is protocol information obtained from ID information. That is, it is determined whether or not a current protocol must be changed based on a newly-obtained ID. When the current protocol must be changed, that is, when PDATA≠ID_DATA, the process proceeds to step 305. On the other hand, when the current protocol need not be changed, that is, when PDATA=ID_DATA, the process returns to step S301, where an ID is obtained from the obtained ID information storing queue (ID_QUEUE) again.

In step S305, PDATA, which is information indicating a currently-set protocol, is updated to the value of the protocol information (ID_DATA) obtained based on the ID information, and the process proceeds to step S309. In step S309, the flag (CFLG) which indicates that PDATA indicating the currently-set protocol or CDATA indicating the currently-connected party has been changed is turned ON (true), and then the process is repeated starting from step S301.

In step S303, when ID_TYPE is not PRT (protocol information), the process proceeds to step S306, where it is determined whether the ID_TYPE is CON (connected party information). When the ID_TYPE is connected party information, the process proceeds to step S307, and otherwise, the process returns to step S301.

In step S307, it is determined whether or not CDATA, which is information indicating a currently-connected party, is the same as ID_DATA, which is information of connected party obtained based on the ID information. That is, it is determined whether or not the currently-connected party must be changed based on the newly-obtained ID. When the currently-connected party must be changed, that is, when CDATA≠ID_DATA, the process proceeds to step 308. On the other hand, when CDATA=ID_DATA, the process returns to step S301, where an ID is obtained from the obtained ID information storing queue (ID_QUEUE) again.

In step S308, CDATA, which is information indicating the currently-connected party, is set to the value of ID_DATA, which is information of connected party obtained based on the ID information, and then the process proceeds to step S309. In step S309, the flag (CFLG), which indicates that PDATA or CDATA has been changed, is turned ON (true), and then the process returns to step S301.

Next, "update of network state" in step S204 in the flowchart shown in FIG. 10 will be described with reference to FIG. 12.

In step S501, it is checked whether or not the flag (CFLG), which indicates whether or not the network state should be updated, is ON. If the flag is ON, the process proceeds to step S502. On the other hand, if the network state need not be updated, the process is completed.

When the CFLG is ON, that is, when the network state should be updated, the process proceeds to step S502, where the current state of the network established by this process is checked. When communication processing is being performed, the process proceeds to step S503, where the currently-connected network is brought into disconnection. When communication processing is not being performed, the process proceeds to step S504.

Then, in step S504, it is checked whether or not the value of PDATA, which is information indicating the currently-set protocol, and the value of CDATA, which is information indicating the currently-connected party, are effective. When the values are effective, the process proceeds to step S505, where network connection is established based on the PDATA and the CDATA. When the values are ineffective, for example, when they are set to null, the process is completed.

As described above, when a protocol card continuously exists in the sensor effective area, ID information of the same protocol is stored immediately after an ID is obtained from the obtained ID information storing queue (ID_QUEUE). Also, when a connected-party card continuously exists in the sensor effective area, ID information of the same connected party is stored immediately after an ID is obtained from the obtained ID information storing queue (ID_QUEUE). Accordingly, the ID obtained from each card is continuously set to each of the PDATA and CDATA, and thus communication is continuously performed.

When a protocol card is removed from the sensor effective area during communication and when another protocol card is put in the sensor effective area, the ID of the new protocol card is stored in the obtained ID information storing queue (ID_QUEUE), PDATA indicating the currently-set protocol is updated to the ID corresponding to the new protocol card, and communication is restarted with the same connected party by the new protocol.

When a connected-party card is removed from the sensor effective area during communication and when another connected-party card is put in the sensor effective area, the ID of the new connected-party card is stored in the obtained ID information storing queue (ID_QUEUE), CDATA indicating the currently-connected party is updated to the ID corresponding to the new connected-party card, and communication is restarted with the new connected party by the same protocol.

Further, when a protocol card or a connected-party card is removed from the sensor effective area during communication and when another protocol card or another connected-party card is not put in the sensor effective area, ID information which does not include effective protocol information or connected-party information, that is, a special ID in which the data portion is all 0, is stored in the obtained ID information storing queue (ID_QUEUE), as described above.

Figure 11:
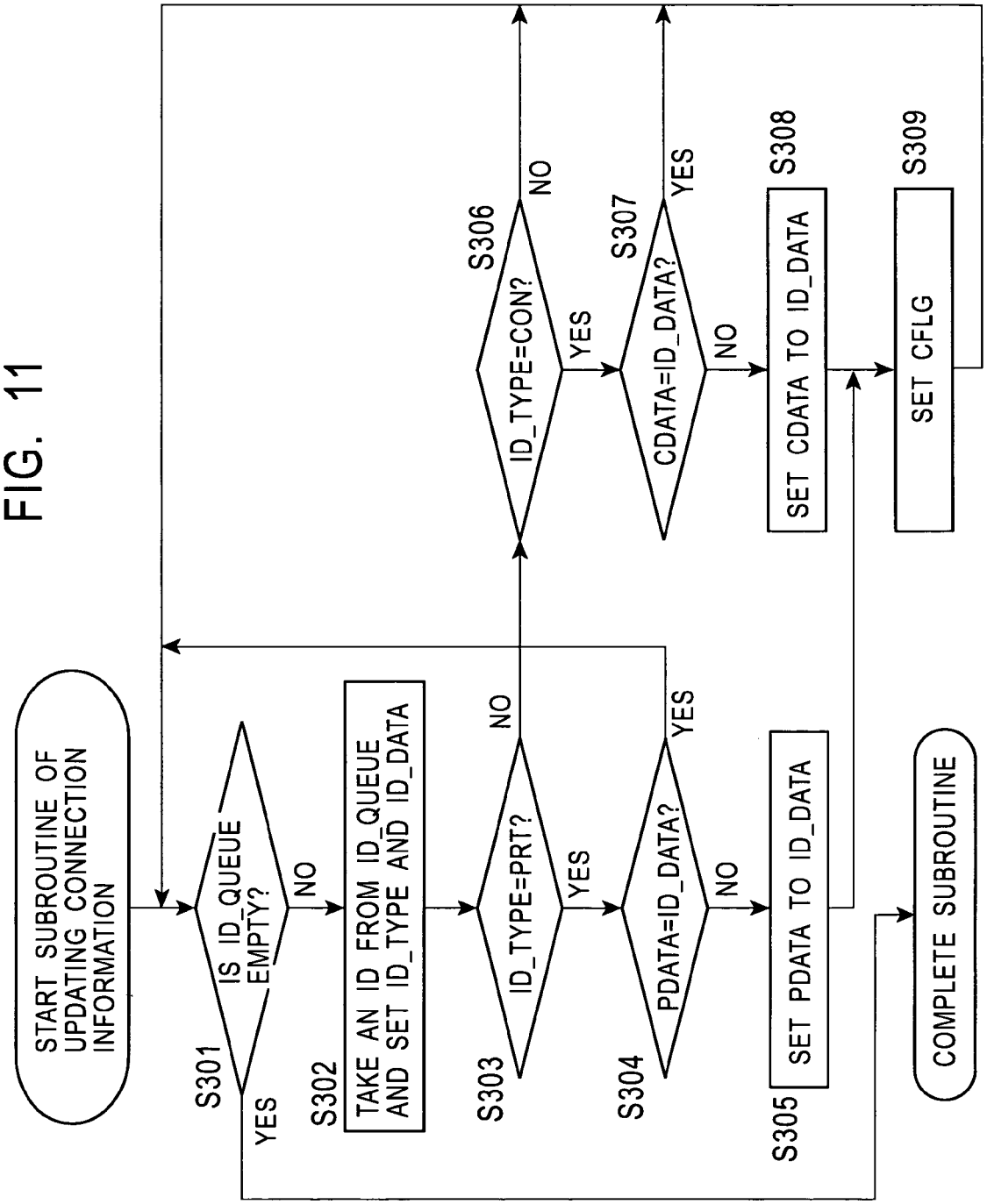
FIG. 11 is a flowchart of a process performed by the information processing apparatus of the second embodiment.
Figure 12:
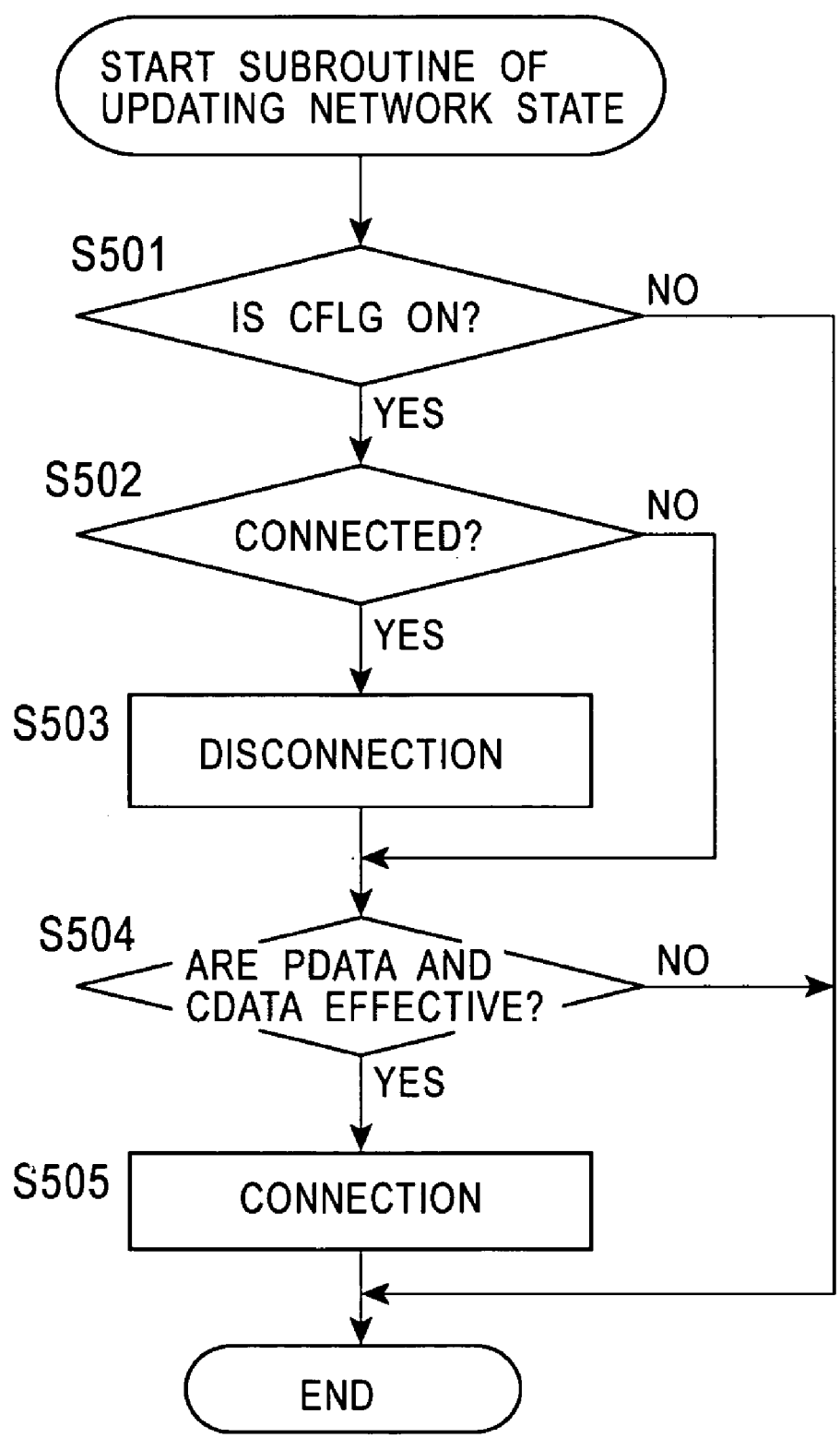
FIG. 12 is a flowchart of a process performed by the information processing apparatus of the second embodiment.

In this case, an ineffective value is set to PDATA or CDATA in step S305 or S308 in FIG. 11. Then, in step S309, the flag indicating whether or not the network state should be updated is set to ON. Therefore, the determination in step S501 is "Yes". Then, when communication is being performed, the communication line is disconnected in step S503, PDATA or CDATA is determined to be ineffective in step S504, and the process is completed without performing another connecting process.

In this way, only when a pair of protocol card and connected-party card exist in a predetermined area, network connection can be established.

When network connection is performed by using protocols, an application program corresponding to each protocol may be started, or connection protocols may be switched in an application program. Also, in the above-described embodiment, cards are recognized by using a camera. Alternatively, an RFID tag embedded in a model (for example, model of telephone) may be detected by an RFID reader. Also, another ID detecting method may be used.

THIRD EMBODIMENT

Process for Enhancing Robustness Based on Determination of Presence of an Object Next, a process for enhancing robustness based on determination of presence of an object will be described as a third example of a process to which the information processing apparatus and the information processing method of the present invention are applied.

In this embodiment, a method of determining presence of an object in an area and a method of identifying the type of the object are used in combination, so that the robustness of the system is enhanced.

As can be understood from the above-described embodiments, the information processing apparatus of the present invention determines whether or not an object exists in a specific area corresponding to the sensor effective area, performs startup/exit of a process and parameter setting, and changes the internal state of the information processing apparatus. In this case, the sensor may not read an ID, for example, because a user's hand covers the ID. In such a state, an application or communication processing may be ended, whereby that unintended processing may be performed.

This will be described by using a method of starting/exiting an application program using a two-dimensional code in a book, which has been described in the first embodiment. When a two-dimensional code is recognized by using a camera, the two-dimensional code may not be recognized at a part of a frame of the camera. This problem occurs when a recognition algorithm is failed due to noise of an image, or when a part or whole of the two-dimensional code is covered by a user's hand.

In such a case, it is determined that an ID has disappeared from the sensor effective area and the application is exited. Then, in the next frame, an ID is recognized, and the application is started. In this way, by faithfully performing the process, exit/startup of an application program is performed frequently, which causes inconvenience.

In this embodiment, in order to solve the above-described problem, an object presence determining unit for determining presence of an object in an area and an object type determining unit for determining the type of an object are provided in the object-identifying unit 102 of the information processing apparatus 100 shown in FIG. 1. With this configuration, processing is performed based on determination results from the two determining units, frequent startup/exit of processing in the information processing apparatus can be suppressed, and highly robust and stable processing results. That is, even when identification of an ID is temporarily impossible, if presence of an object can be determined, the state is not updated in the information processing apparatus and then a process of identifying an ID is performed again, so that stable control can be achieved.

Figure 14:
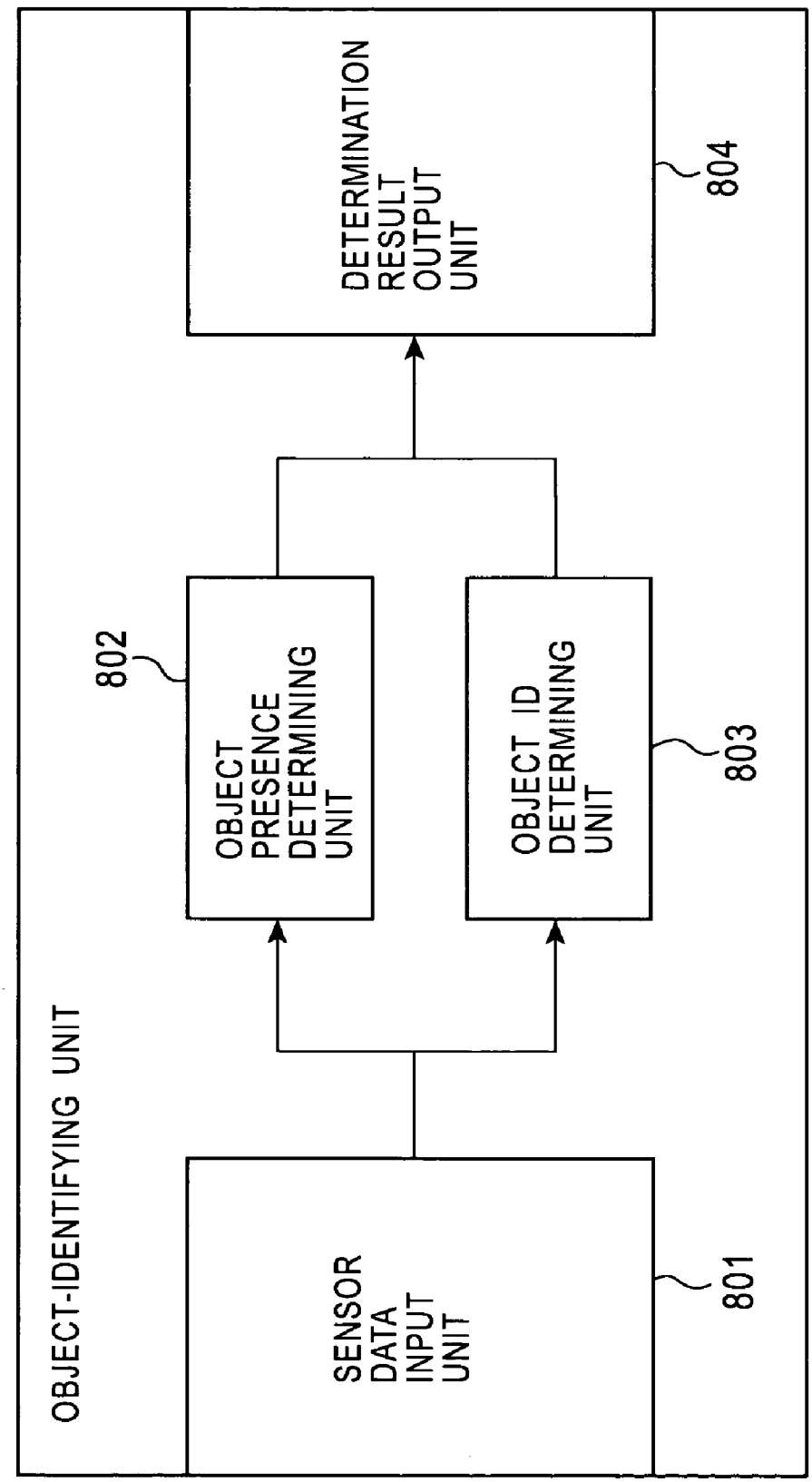
FIG. 14 shows an example of the configuration of an object-identifying unit of an information processing apparatus according to a third embodiment.

FIG. 14 shows a specific configuration of the object-identifying unit 102 according to this embodiment. As shown in FIG. 14, the object-identifying unit 102 includes an object presence determining unit 802 for determining presence of an object in the sensor effective area, and an ID-determining unit 803 for identifying the ID of an object. Each of the object presence determining unit 802 and the ID-determining unit 803 receives sensor input information, such as an image taken by a camera, from a sensor data input unit 801, and then outputs a determination result to the information processing unit 103 (see FIG. 1) through a determination result output unit 804.

Hereinafter, a system in which an application program is started/exited by using the book described in the first embodiment will be described. A method of this embodiment can be generally applied not only to the first embodiment, but also to the communication processing of the second embodiment and to an information processing apparatus which obtains IDs of various objects and which changes an internal state based on the IDs.

Figure 15:
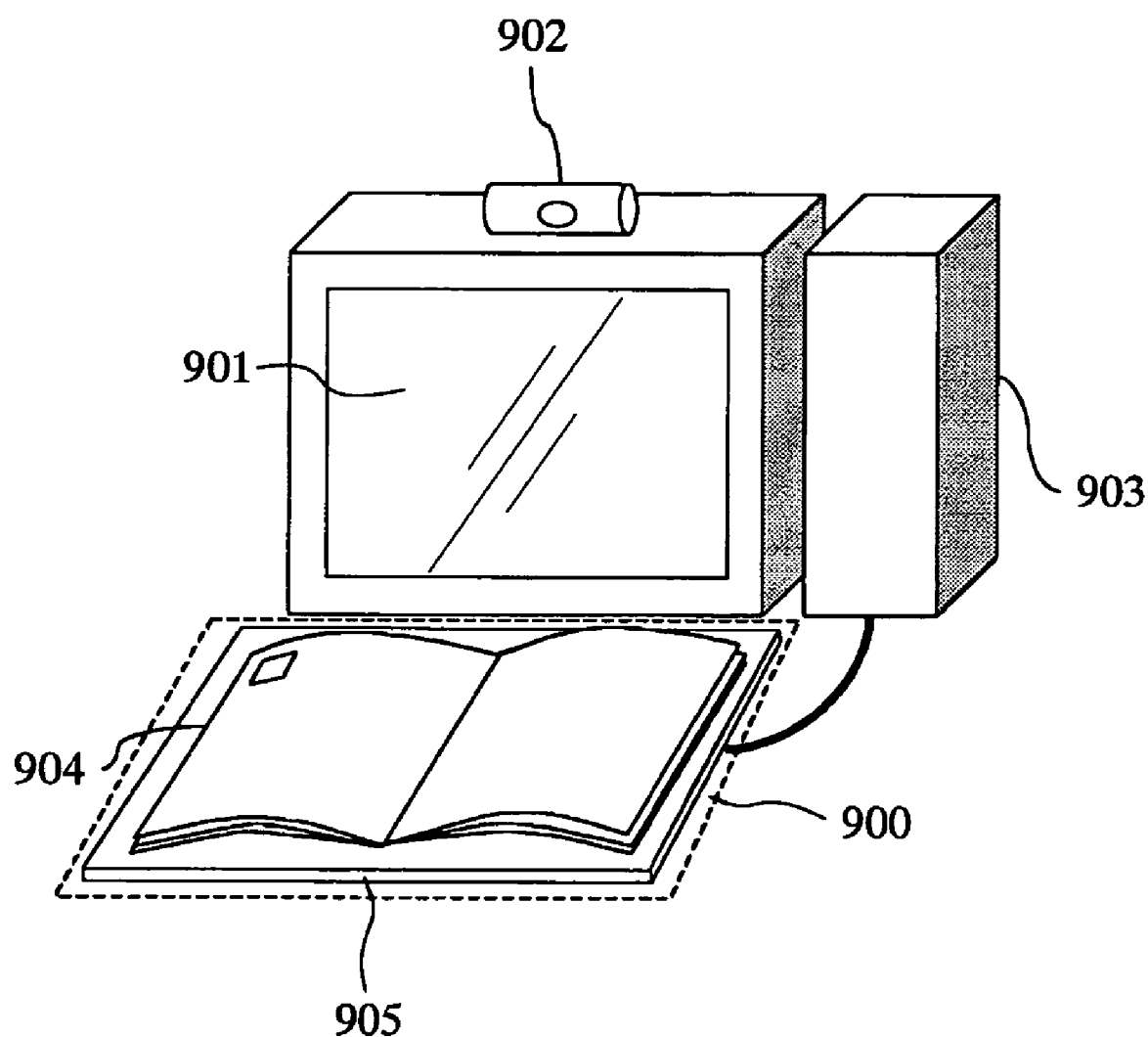
FIG. 15 shows the system structure of the information processing apparatus of the third embodiment.

FIG. 15 shows an example of the system structure of the information processing apparatus used for performing this embodiment. In this system, a camera 902 provided on a display 901 functions as a sensor, and the camera 902 takes an image of the area in front of the display 901. As in the first embodiment, a predetermined area in front of the display 901, which can be taken by the camera 902, is set as an image pickup range 900 corresponding to the sensor effective area. A data processing unit 903 includes the elements shown in FIG. 1 except the sensor 101 (corresponding to the camera 902) and the output unit 106 (corresponding to the display 901); that is, the object-identifying unit 102, the information processing unit 103, the ID/internal-state correspondence storage unit 104, and the network interface 105 (if necessary) of the information processing apparatus shown in FIG. 1. The object-identifying unit 102 includes the two determining units, as shown in FIG. 14.

Further, in this embodiment, the system includes an object (book) detecting sensor 905 for detecting presence of a book 904 in the sensor effective area. The object (book) detecting sensor 905 is placed in the image-pickup range 900, which serves as the sensor effective area.

The object (book) detecting sensor 905 is provided in order to detect only the presence of a book in the sensor effective area, and does not identify the ID of the book. Therefore, the object (book) detecting sensor 905 can be of a simple configuration.

Figure 16:
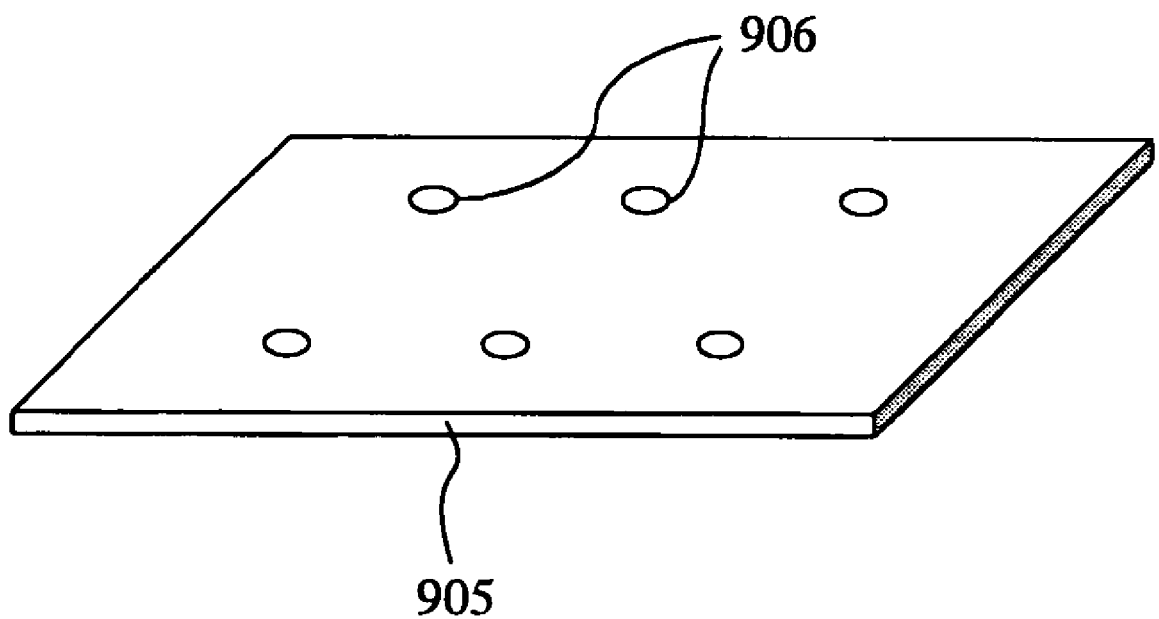
FIG. 16 shows an example of the configuration of an object detecting sensor according to the third embodiment.

FIG. 16 shows an example of the object (book) detecting sensor 905. A number of photodetectors 906 are embedded in the platy sensor for putting a book thereon. When an object (book) exists in the area of the object (book) detecting sensor 905, light is cut off. Accordingly, presence of the book as an object can be easily detected.

Specifically, output of each photodetector is binarized by using an appropriate threshold, so as to determine "light" or "dark". When the number of photodetectors determined to be "dark" is equal to or more than the threshold, it is determined that a book exists.

Figure 17:
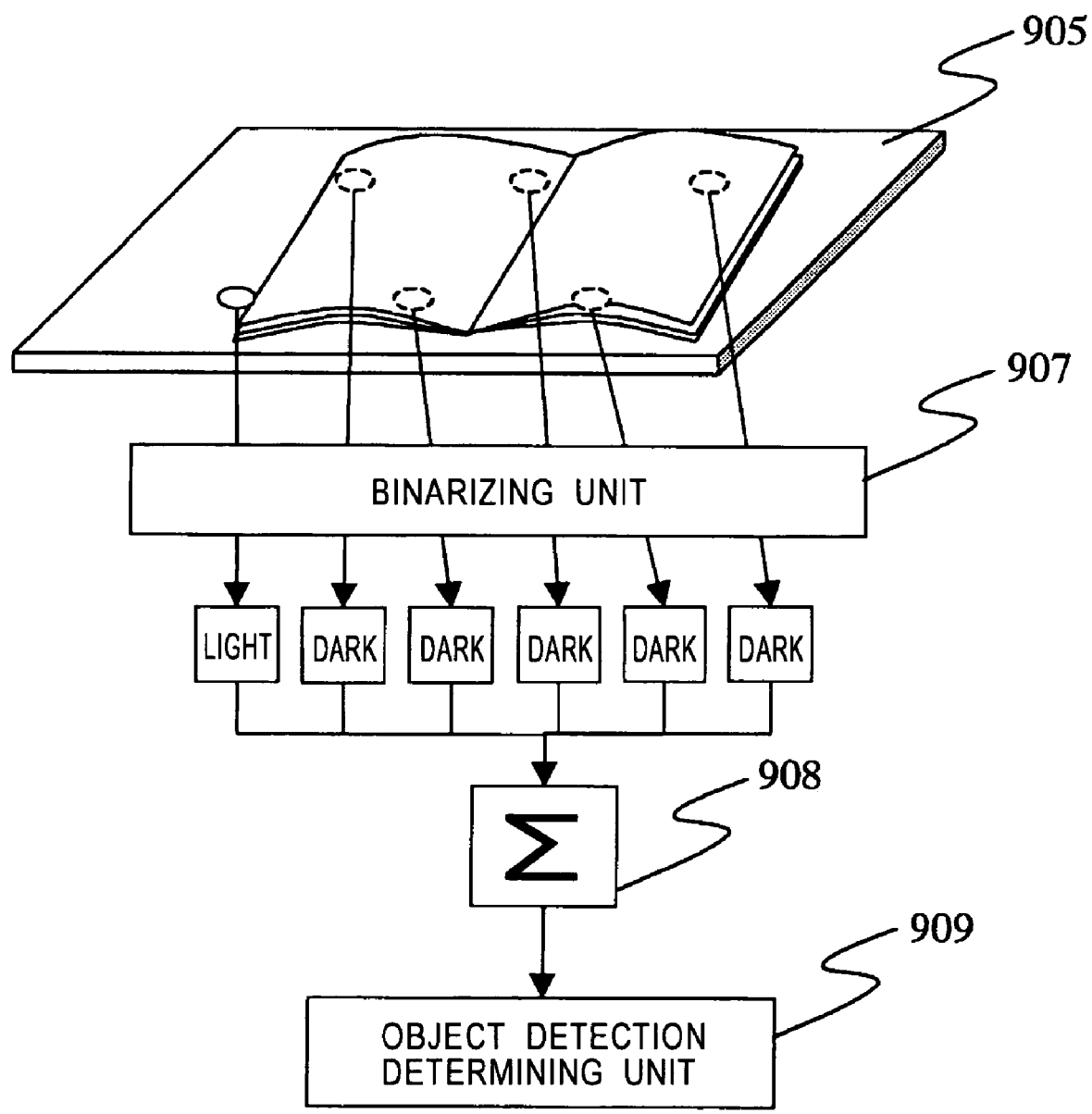
FIG. 17 shows another example of the configuration of the object detecting sensor according to the third embodiment.

More specifically, when a book is put on the object (book) detecting sensor 905 as shown in FIG. 17, light to many photodetectors in the object (book) detecting sensor 905 is cut off. A binarizing unit 907 binarizes output of each photodetector in the object (book) detecting sensor 905, in which "light" is represented by 0 and "dark" is represented by 1. Then, a computing unit 908 calculates the total value of binary data, and the output value of the computing unit 908 is compared with a predetermined threshold by an object detection determining unit 909, so as to determine presence of an object. In the example shown in FIG. 17, outputs of five photodetectors among six photodetectors are "dark" (1), and the other photodetector is "light" (0). Thus, the output value of the computing unit 908 is 5. Here, the threshold in the object detection determining unit 909 is set to 4, and it is determined that an object exists when the output value is more than 4. In this case, the output value from the computing unit 908 is 5, and thus it is determined that an object (book) exists.

Figure 18:
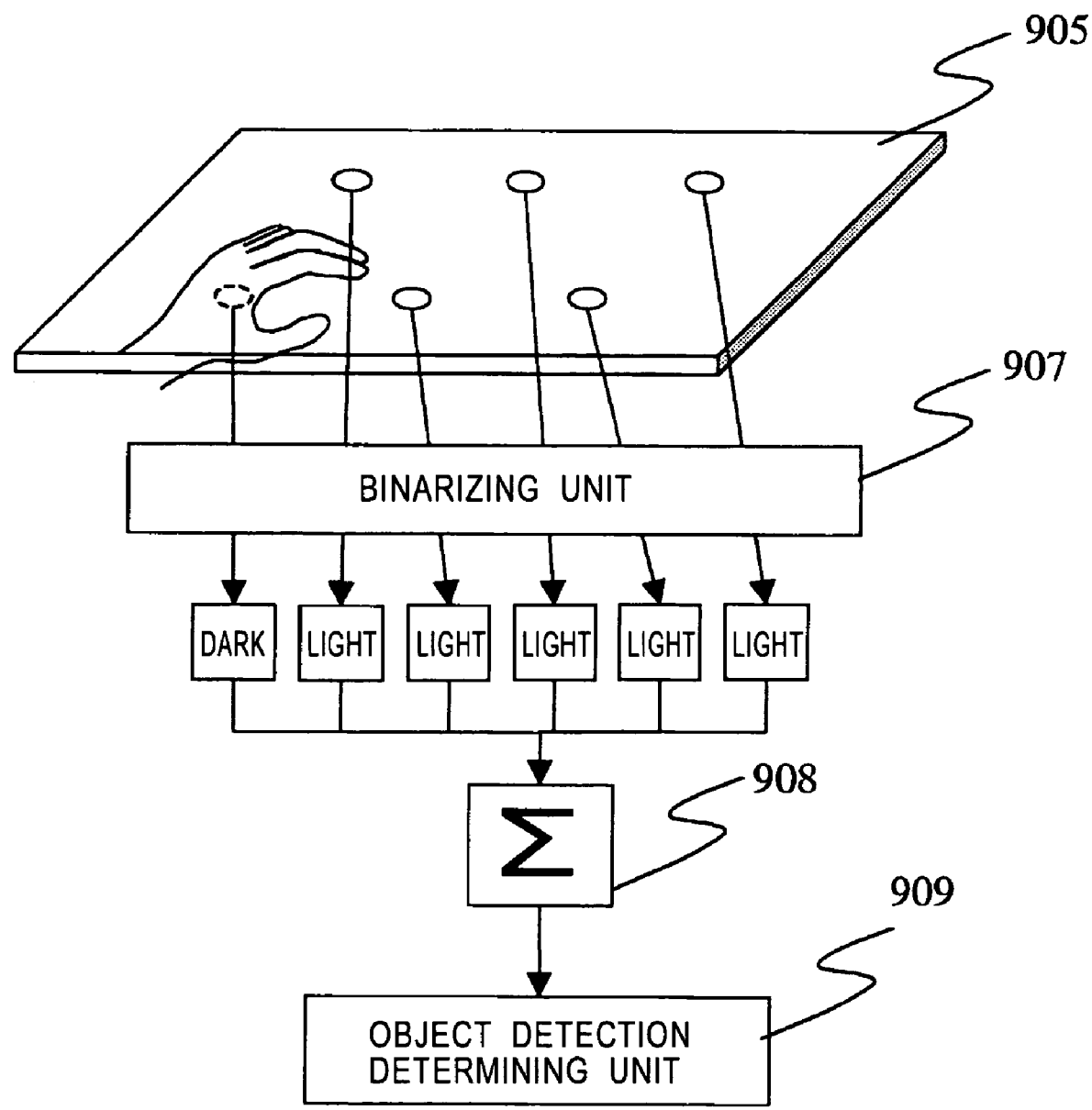
FIG. 18 shows another example of the configuration of the object detecting sensor according to the third embodiment.

On the other hand, when an object (book) is not put on the object (book) detecting sensor 905 as shown in FIG. 18, light to almost all the photodetectors in the object (book) detecting sensor 905 is not cut off. In this case, output of only one photodetector is cut off by a user's hand, and thus the binarizing unit 907 determines one of the six photodetectors is dark (1) and the other five photodetectors are light (0). Therefore, the output value from the computing unit 908 is 1. Here, the threshold in the object detection determining unit 909 is set to 4, and it is determined that an object exists when the output value is more than 4. In this case, the output value from the computing unit 908 is 1, and thus it is determined that an object (book) does not exist.

Figure 19:
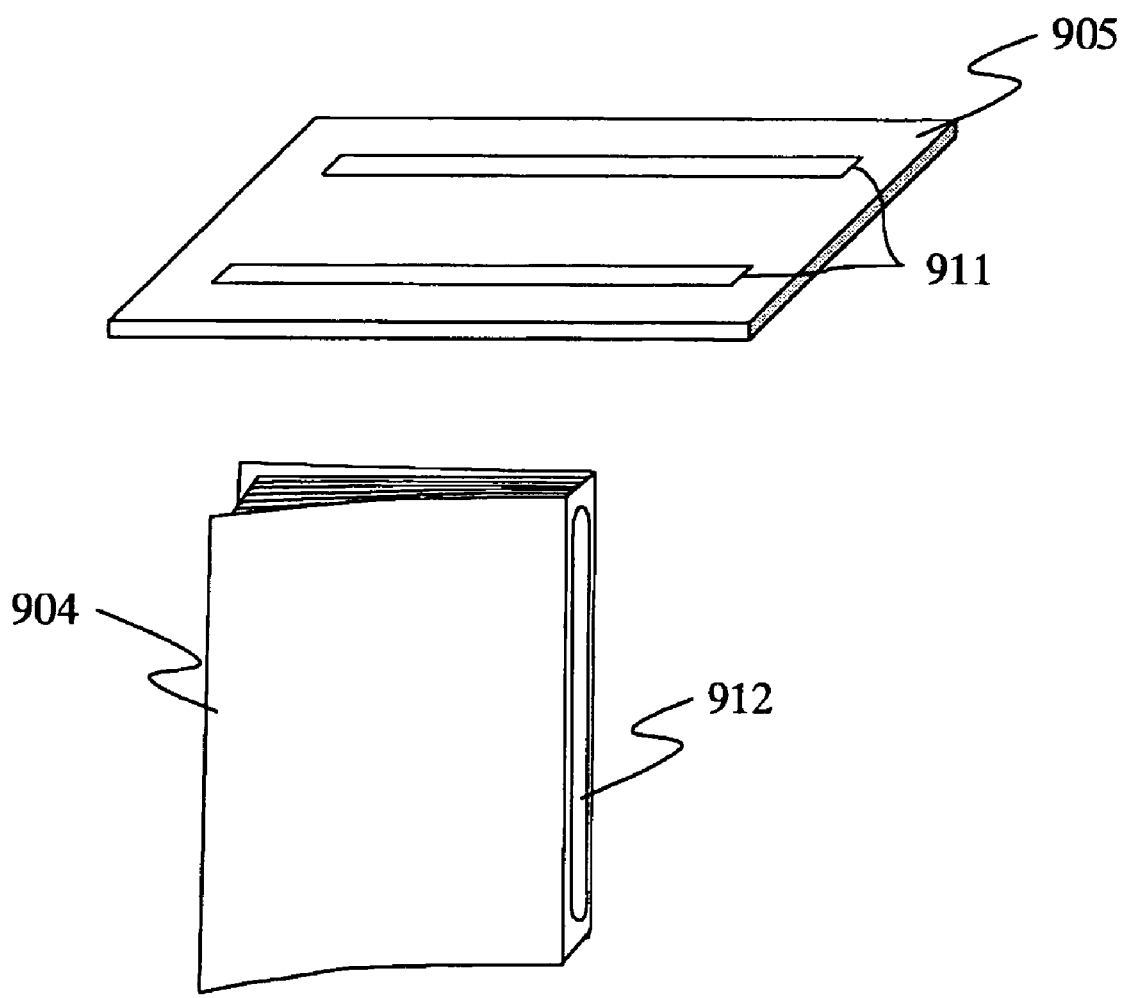
FIG. 19 shows another example of the configuration of the object detecting sensor according to the third embodiment.

FIG. 19 shows another example of the object (book) detecting sensor which can be applied in this embodiment. In FIG. 19, a conductive sheet 912 is attached on the back of the book 904. On the other hand, two electrodes 911 are provided on the object (book) detecting sensor 905, so as to measure whether or not the two electrodes 911 are in conduction.

When the two electrodes 911 are in conduction, it is determined that the book 904 exists on the book detecting sensor 905, and when the electrodes are not in conduction, it is determined that the book 904 does not exist. With this configuration, presence of an object can be easily determined without using photodetectors. Also, other various methods may be used. For example, an optical sensor, an infrared sensor, or a physical switch structure may be used. Alternatively, a magnetic substance may be attached to an object so as to detect the object by a magnetic sensor.

In the system structure shown in FIG. 15, the dedicated object (book) detecting sensor 905 for detecting presence of an object is applied. Alternatively, a sensor for detecting an ID may also be used for detecting presence of an object.

That is, a sensor (in this case, the camera 902) for identifying the type (ID) of an object may be used for detecting presence of an object (for example, a book). In this case, presence of an object (book) can be determined and also the ID of the object can be obtained based on an image taken by the camera 902.

Specifically, for example, presence of an object is determined by analyzing an image taken by the camera 902. Hereinafter, a book detecting method using difference in images will be described. First, at initialization of the system, an image taken by the camera is stored as a reference image. As the reference image, an image of a state where an object does not exist is used.

In order to perform processing, an image taken by the camera is input to the object presence determining unit 802 of the object-identifying unit 102 shown in FIG. 14, so as to compare the input image with the reference image. That is, difference in a corresponding pixel of the reference image and the input image is obtained, and the absolute value of the difference is calculated over all pixels, so as to obtain difference total data. When the value of the difference total data surpasses a predetermined threshold, it is determined that an object exists in a target area. On the other hand, when the value of the difference total data is less than the predetermined threshold, it is determined that an object does not exist in the target area. In this way, presence of an object and the type of the object can be determined by using a sensor.

Some methods for detecting presence of an object have been described above. When presence of an object is detected, only one of the detecting methods may be used, or a number of detecting methods may be used in combination. In the latter method, detection results of the methods are comprehensively determined so as to obtain a final result. For example, a method of checking conduction shown in FIG. 19 and a method using an image difference may be used in combination so as to obtain a final result. Accordingly, presence of an object can be reliably detected, instability of processing in the information processing apparatus can be eliminated, and thus robustness can be enhanced.

With the above-described configuration, a determination result indicating whether or not an object exist and an identification result of the ID of an object (when an object exists) can be individually obtained. Hereinafter, a method of robustly changing the state of the information processing apparatus by using the two pieces of identification information will be described, by using the process of starting/exiting a program described in the first embodiment as an example.

Figure 20:
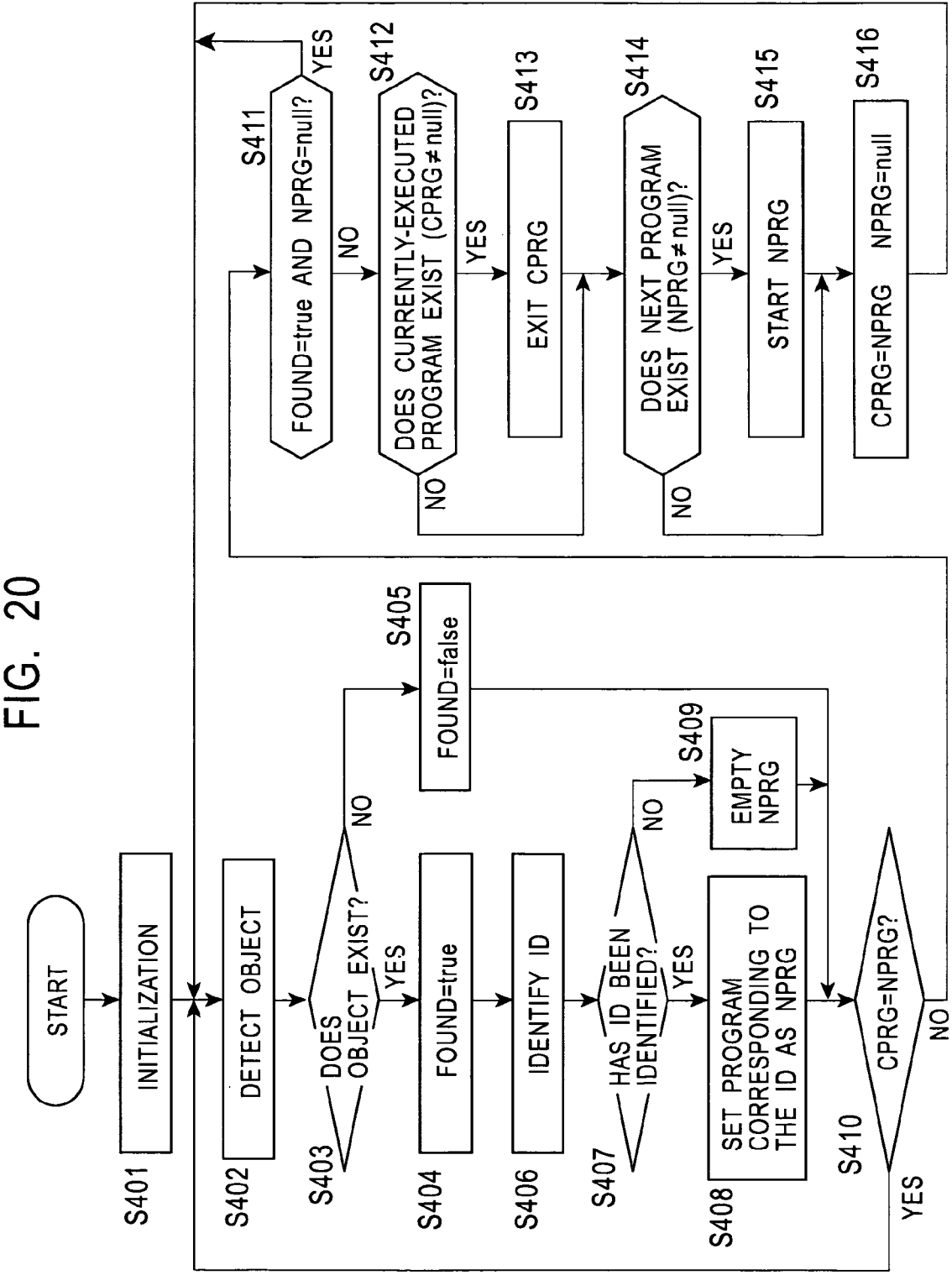
FIG. 20 is a flowchart of a process illustrating a processing sequence performed by the information processing apparatus of the third embodiment.

FIG. 20 shows a process of starting/exiting an application program to which the method of this embodiment is applied.

Variables used in this process includes a flag (FOUND) indicating whether an object existed in a target area, in addition to a next program (NPRG) and a current program (CPRG) used in the first embodiment. Now, steps performed in the process shown in FIG. 20 will be described.

First, in step S401, variables are initialized. Next program (NPRG) and current program (CPRG) are initialized to null string (for example, null). When the null string "null" is set, an ineffective special path may be set, the path being regarded as null. The flag (FOUND) indicating whether an object existed in a target area is set to false.

Then, in step S402, it is determined whether an object exists. This step corresponds to a step of detecting an object by the object detecting sensor 905 in the configuration shown in FIG. 15. As described above, various things can be used as a detecting unit for detecting an object, such as photodetectors, a conductive sheet and electrodes, and an image taken by a camera. The detecting unit inputs information to the object presence determining unit 802 in the object-identifying unit 102 shown in FIG. 14, and then it is determined whether or not an object exists in the sensor effective area based on the input information.

The type (ID) of an object need not be determined in this step of recognizing presence of the object. That is, when the object is a book, presence of the book should be determined, and a two-dimensional code on the book need not be identified.

When it is determined that an object exists in step S403, the process proceeds to step S404, where the flag (FOUND) indicating presence of an object in a target area is set to "true", which indicates presence. On the other hand, when an object does not exist, the process proceeds to step S405, where the flag (FOUND) is set to "false", which indicates absence of an object.

Then, in step S406, the ID of the object is identified. This step corresponds to a step of detecting the ID by the sensor. In the configuration shown in FIG. 15, the image of the image-pickup range 900 taken by the camera 902 is input to the ID-determining unit 803 (see FIG. 14) of the object-identifying unit 102 in the data processing unit 903, and the ID is identified based on the two-dimensional code included in the input image. Alternatively, the ID may be identified based on a bar code or an RF tag, or by analyzing the taken image.

Then, in step S407, it is determined whether or not the ID has been successfully identified. When the ID has been identified, the process proceeds to step S408, where a next program corresponding to the ID is set as NPRG. That is, the information processing unit 103 shown in FIG. 1 searches the table stored in the ID/internal-state correspondence storage unit 104 based on ID information input from the object-identifying unit 102, obtains path information of a program, and sets a string indicating the obtained path name to NPRG. As a result, the path of the next program is set to NPRG.

On the other hand, when the ID has not been obtained, such as, when a special ID of all-0 has been output from the object-identifying unit to the information processing unit, the process proceeds to step S409, where the next program (NPRG) is set to null. NPRG=null means that a next program is not set.

Then, in step S410, it is determined whether or not the current program (CPRG) is the same as the next program (NPRG). When CPRG=NPRG, the process returns to step S402, and steps of recognizing an object and identifying an ID are repeatedly performed.

When CPRG is different from NPRG, the process proceeds to step S411. In step S411, it is determined whether the flag (FOUND) indicating presence of an object in a target area is set to "true" and also the next program (NPRG) is set to null.

When the determination in step S411 is "Yes", an object exists in the sensor effective area, but the ID of the object has not been able to identified for some reasons. Thus, the process returns to step S402, and steps for recognizing an object and identifying the ID of the object are repeatedly performed.

When the determination in step S411 is "No", the process proceeds to step S412, where the value of the current program (CPRG) is checked. When the current program (CPRG) is not null, that is, when a program is currently being executed, the process proceeds to step S413, so as to exit the current program (CPRG).

Then, in step S414, the value of the next program (NPRG) is checked. Specifically, it is checked whether the next program has been set (NPRG≠null) or not (NPRG=null). When the next program (NPRG) has been set (NPRG≠null), the process proceeds to step S415, where an NPRG setting file is obtained in accordance with the path set to the next program (NPRG), so as to start the next program.

When it is determined that the next program does not exist (NPRG=null) in step S414, the process jumps to step S416. In step S416, the set value of the next program (NPRG) is substituted into the set value of the current program (CPRG). In addition, a null string (null) is set to the next program (NPRG), and the process returns to step S402, so as to perform steps of recognizing an object and identifying the ID of the object again.

In the above-described process, even if the ID of an object cannot be obtained, when presence of the object can be determined, the determination in step S411 is "Yes". In that case, the process does not proceed to step S413 (step of exiting the current program (CPRG)). Therefore, the current program is not exited due to ID obtaining error, so that the current program is continuously executed. Accordingly, startup/exit of a program is not repeated frequently, and thus highly stable and robust control can be achieved.

System Structure

Figure 21:
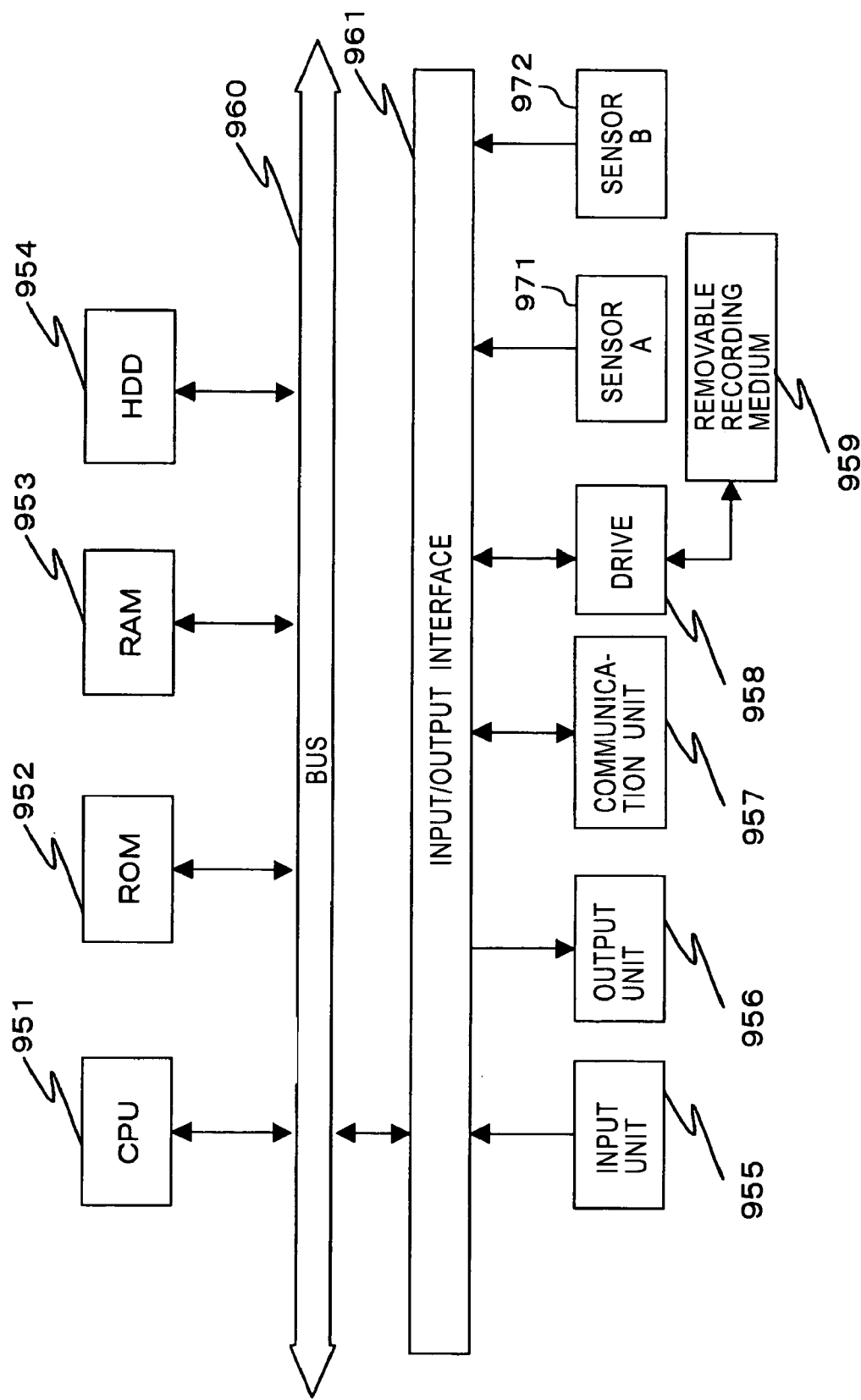
FIG. 21 shows an example of the hardware structure of the information processing apparatus of the present invention.

Next, an example of the hardware structure of the information processing apparatus according to the present invention will be described with reference to FIG. 21. In FIG. 21, a central processing unit (CPU) 951 is a processor which executes various application programs and an operating system (OS). A read-only-memory (ROM) 952 stores programs executed by the CPU 951 or fixed data as computing parameters. A random access memory (RAM) 953 is used as a storage area or a work area for programs executed by the CPU 951 and parameters which change in program processing. An HDD 954 controls a hard disk and stores/reads various types of data and programs in/from the hard disk.

A bus 960 includes a peripheral component Internet/ Interface (PCI) bus or the like, and enables data transmission with each input/output device through each module and an input/output interface 961.

An input unit 955 includes a keyboard and a pointing device, and is operated by a user in order to input various commands and data to the CPU 951. An output unit 956 includes a CRT or a liquid crystal display for displaying images, and displays various information in a text or image form.

A communication unit 957 performs communication processing with another device. A drive 958 performs recording/playback of data in a removable recording medium 959, such as a flexible disk, a compact disc read only memory (CD-ROM), a magneto-optical (MO) disc, a digital versatile disc (DVD), a magnetic disc, or a semiconductor memory. The drive 958 plays back a program or data from the removable recording medium 959, and stores a program or data in the removable recording medium 959.

A sensor A (971) includes a camera or an RF reader, as described in the above embodiments, and obtains ID information from an object put in the sensor effective area. A sensor B (972) is used for recognizing presence of an object, and includes photodetectors, a current detecting unit using a conductor, an optical sensor or a magnetic sensor, so as to detect presence of an object in the sensor effective area, as described in the third embodiment.

In each of the above-described embodiments, the process described with reference to the flowcharts, that is, processes of starting/exiting an application program, starting/ending communication processing, changing a connected party, and changing parameters, are performed in accordance with the programs stored in the ROM or another storage medium, each process being determined by the CPU 951 based on information input from the sensor A (971) or B (972).

The series of processes described in this specification can be performed by hardware or software, or by combination thereof. When the processes are performed by software, a program recording the processing sequence is installed into a memory in a computer incorporated in dedicated hardware or into a multi-purpose computer which can perform various processing, so that the processes can be performed.

The program can be recorded in a storage medium, such as a hard disk or a ROM, in advance. Alternatively, the program can be temporarily or permanently stored (recorded) in a removable recording medium, such as a flexible disc, a CD-ROM, an MO disc, a DVD, a magnetic disc, or a semiconductor memory. These types of removable recording media can be provided as so-called package software.

Also, the program can be installed from the removable medium into a computer. Alternatively, the program can be wirelessly transferred from a download site to a computer, or can be transferred by wire through a local area network (LAN) or the Internet. In that case, the computer receives the transferred program and then installs the program into a storage medium in the computer, such as a hard disk in the computer.

The various processes described in the specification may be performed in time-series in accordance with the described order, or may be performed in parallel or individually depending on the processing ability of the device performing the processes, or according to need.

The present invention has been described in detail with reference to the specific embodiments. However, those skilled in the art can realize modifications and substitutions of these embodiments without deviating from the scope of the present invention. That is, the present invention has been disclosed by using examples, and should not be interpreted in a limited manner. In order to determine the scope of the present invention, the attached claims should be considered.

The invention claimed is:

1. An information processing apparatus, comprising:
a sensor for detecting an object, the sensor configured to continuously sense a sensor effective area;
an object-identifying unit which obtains an ID corresponding to the object within the sensor area, the ID based on information input from the sensor and the object-identifying unit configured to output the obtained ID based on the information input from the sensor; and
an information processing unit which receives the ID from the object-identifying unit so as to perform a program corresponding to the ID;
wherein the information processing unit compares a program that is set based on a newly-input ID with a program that is set based on an already-input ID from the object-identifying unit, and ends a currently-executed program when the two programs are different from each other.

2. An information processing apparatus according to claim 1, wherein the information processing unit compares the program that is set based on the newly-input ID with the program that is set based on the already-input ID from the object-identifying unit, and ends the currently-executed program so as to start the program that is set based on the newly-input ID when the two programs are different from each other.

3. An information processing apparatus according to claim 1, further comprising an ID/internal-state correspondence storage unit for storing a processing information table in which IDs to be obtained by the object-identifying unit are associated with paths of execution files, wherein the information processing unit searches the ID/internal-state correspondence storage unit based on the ID input from the object-identifying unit so as to determine a program to be executed.

4. An information processing apparatus according to claim 1, wherein the sensor detects the object in the sensor effective area serving as an object recognizing area, the object-identifying unit outputs a special ID indicating absence of an object to the information processing unit when information received from the sensor does not include object information from which an ID can be obtained, and the information processing unit sets a next program to null based on the special ID.

5. An information processing apparatus according to claim 1, wherein the information processing unit starts an application program that is set based on the ID input from the object-identifying unit, compares an application program that is set based on the newly-input ID with an application program that is set based on the already-input ID from the object-identifying unit, and ends the currently-executed application program when the two application programs are different from each other.

6. An information processing apparatus, comprising:
a sensor for detecting objects;
an object-identifying unit which obtains first and second IDs corresponding to the objects based on information input from the sensor so as to repeatedly output the obtained first and second IDs based on the information input from the sensor; and
an information processing unit which repeatedly receives the first and second IDs from the object-identifying unit so as to perform a program corresponding to the first and second IDs,
wherein the information processing unit sets a communication protocol corresponding to the first ID input from the object-identifying unit and sets a connected party corresponding to the second ID input from the object-identifying unit, and when at least one of a communication protocol and a connected party corresponding to first and second newly-input IDs from the object-identifying unit is different from at least one of a communication protocol and a connected party corresponding to first and second already-input IDs, the information processing unit changes the communication protocol or the connected party based on the corresponding newly-input ID.

7. An information processing apparatus according to claim 6, further comprising an ID/internal-state correspondence storage unit for storing a processing information table including data of correspondence between IDs to be obtained by the object-identifying unit and communication protocol information and data of correspondence between IDs to be obtained by the object-identifying unit and connected party information, wherein the information processing unit searches the ID/internal-state correspondence storage unit based on the first and second IDs input from the object-identifying unit so as to obtain information of corresponding communication protocol and connected party.

8. An information processing apparatus according to claim 7, wherein the object-identifying unit comprises an ID-determining unit for obtaining an ID corresponding to the object and an object presence determining unit for determining presence of the object in a sensor detecting area, and wherein the information processing unit controls processing based on ID information determined by the ID-determining unit and on presence determination information of the object determined by the object presence determining unit, ends the currently-executed program when the program corresponding to the newly-input ID based on ID information determined by the ID-determining unit is different from the program corresponding to the already-input ID and when the object presence determining unit determines absence of the object, and continues the currently-executed program when the program corresponding to the newly-input ID based on the ID information determined by the ID-determining unit is different from the program corresponding to the already-input ID and when the object presence determining unit determines presence of the object.

9. A communication processing apparatus performing communication processing, the apparatus comprising:
a sensor configured to continuously sense a sensor effective area and for detecting first and second objects positioned within the sensor effective area;
an object-identifying unit which obtains first and second IDs corresponding to the first and second objects based on information input from the sensor, the object-identifying unit configured to output the obtained first and second IDs based on the information input from the sensor; and
an information processing unit configured to receive the first and second IDs from the object-identifying unit, the information processing unit further configured to perform a program corresponding to the received IDs;
wherein the information processing unit sets a communication protocol corresponding to the first ID input from the object-identifying unit and sets a connected party corresponding to the second ID input from the object-identifying unit.

10. A communication processing apparatus performing communication processing, the apparatus comprising:
a sensor for detecting objects;
an object-identifying unit which obtains first and second IDs corresponding to the objects based on information input from the sensor, so as to repeatedly output the obtained first and second IDs based on the information input from the sensor; and
an information processing unit which repeatedly receives the first and second IDs from the object-identifying unit so as perform a program corresponding to the IDs;
wherein the information processing unit sets a communication protocol corresponding to the first ID input from the object-identifying unit and sets a connected party corresponding to the second ID input from the object-identifying unit, and wherein when at least one of the communication protocol and the connected party corresponding to first and second newly-input IDs from the object-identifying unit is different from at least one of a communication protocol and a connected party corresponding to first and second already-input IDs, the information processing unit changes the communication protocol or the connected party based on the corresponding newly-input ID.

11. An information processing method, comprising:
identifying an object;
obtaining an ID corresponding to the object based on information input from a sensor when the object is within a continuously sensed sensor effective area;
outputting the obtained ID to an information processing unit based on the information input from the sensor; and
communicating the ID to an information processing unit and performing a program corresponding to the ID;

wherein the information processing unit compares a program that is set based on a newly-input ID with a program that is set based on an already-input ID, and a currently-executed program is ended when the two programs are different from each other.

12. An information processing method according to claim 11, wherein communicating the ID includes comparing the program that is set based on the newly-input ID with the program that is set based on the already-input ID, and the currently-executed program is ended so as to start the program that is set based on the newly-input ID when the two programs are different from each other.

13. An information processing method according to claim 11, further comprising storing a processing information table in an ID/internal-state correspondence storage unit, the processing information table stores IDs that are associated with paths of execution files is searched based on the input ID so as to determine a program to be executed.

14. An information processing method according to claim 11, wherein the sensor detects the object in the sensor effective area serving as an object recognizing area, wherein in the object identifying step, a special ID indicating absence of an object is output to the information processing unit when information received from the sensor does not include object information from which an ID can be obtained, and wherein in the information processing step, a next program is set to null based on the special ID.

15. An information processing method according to claim 11, wherein communicating the ID includes starting an application program that is set based on the input ID, an application program that is set based on the newly-input ID is compared with an application program that is set based on the already-input ID, and the currently-executed application program is ended when the two application programs are different from each other.

16. An information processing method, comprising:
an object identifying step of obtaining first and second IDs corresponding to objects based on information input from a sensor, which detects the objects, and repeatedly outputting the obtained IDs to an information processing unit based on the information input from the sensor; and
an information processing step of repeatedly receiving the first and second IDs obtained in the object identifying step and performing a program corresponding to the first and second IDs;
wherein, in the information processing step, a communication protocol corresponding to the first ID is set and a connected party corresponding to the second ID is set, and when at least one of a communication protocol and a connected party corresponding to first and second newly-input IDs is different from at least one of a communication protocol and a connected party corresponding to first and second already-input IDs, the communication protocol or the connected party is changed based on the corresponding newly-input ID.

17. An information processing method according to claim 16, wherein, in the information processing step, an ID/internal-state correspondence storage unit for storing a processing information table including data of correspondence between IDs and communication protocol information and data of correspondence between IDs and connected party information is searched based on the input first and second IDs so as to obtain information of corresponding communication protocol and connected party.

18. An information processing method according to claim 16, wherein the object identifying step further includes an ID determining step of obtaining an ID corresponding to the object and an object presence determining step of determining presence of the object in a sensor detecting area, and wherein in the information processing step, processing is controlled based on ID information determined in the ID determining step and on presence determination information of the object determined in the object presence determining step, the currently-executed program is ended when the program corresponding to the newly-input ID is different from the program corresponding to the already-input ID and when absence of the object is determined in the object presence determining step, and the currently-executed program is continued when the program corresponding to the newly-input ID is different from the program corresponding to the already-input ID and when presence of the object is determined in the object presence determining step.

19. A communication processing method, comprising:
obtaining first and second IDs corresponding to objects based on information input from a sensor when the objects are located within a continuously sensed sensor effective area
outputting the obtained first and second IDs to an information processing unit based on the information input from the sensor; and
receiving the first and second IDs obtained and performing a program corresponding to the IDs, wherein the information processing unit is configured to compare the program that corresponds to the first ID with another program that corresponds to the second ID, and ends a currently-executed program when the two programs are different from each other; and
wherein a communication protocol corresponding to the first ID is set and a connected party corresponding to the second ID is set.

20. A communication processing method, comprising:
an object identifying step of obtaining first and second IDs corresponding to objects based on information input from a sensor, which detects the objects, and repeatedly outputting the obtained first and second IDs to an information processing unit based on the information input from the sensor; and
an information processing step of repeatedly receiving the first and second IDs obtained in the object identifying step and performing a program corresponding to the IDs,
wherein, in the information processing step, a communication protocol corresponding to the first ID is set and a connected party corresponding to the second ID is set, and wherein, when at least one of a communication protocol and a connected party corresponding to first and second newly-input IDs is different from at least one of a communication protocol and a connected party corresponding to first and second already-input IDs, the communication protocol or the connected party is changed based on the corresponding newly-input ID.

21. A computer program for executing information processing, the program comprising:
obtaining an ID corresponding to an object located within a sensor effective area continuously sensed by a sensor
outputting the obtained ID to an information processing unit based on the information sensed by the sensor; and
processing the ID obtained corresponding to the object and performing a program corresponding to the ID;
wherein a program that is set based on a newly-input ID is compared with a program that is set based on an already-input ID, and a currently-executed program is ended when the two programs are different from each other.

22. A computer program for executing communication processing, the program comprising:
an object identifying routine programmed to obtain first and second IDs corresponding to objects detected within a sensor effective area of a sensor, and repeatedly outputting the obtained first and second IDs to an information processing unit based on the information provided by the sensor; and
an information processing routine programmed to receive the first and second IDs sensed and provided by the sensor, the information processing routine programmed to perform a program corresponding to the IDs, wherein the information processing routine is configured to compare the program that corresponds to the first ID with another program that corresponds to the second ID, and ends a currently-executed program when the two programs are different from each other; and;
wherein a communication protocol corresponding to the first ID is set and a connected party corresponding to the second ID is set.

* * * * *